US012667761B2

(12) United States Patent
Benda et al.

(10) Patent No.: US 12,667,761 B2
(45) Date of Patent: Jun. 30, 2026

(54) HYBRID BASEBALL BAT AND CONSTRUCTION METHODS

(71) Applicant: Delano Bat Corporation, LLC, Cokato, MN (US)

(72) Inventors: Steven John Benda, Cokato, MN (US); Logan James Benda, Cokato, MN (US); Peter James Kruse, Delano, MN (US); Adam Robert Loukus, Calumet, MI (US)

( * ) Notice: Subject to any disclaimer, the term of this patent is extended or adjusted under 35 U.S.C. 154(b) by 1058 days.

(21) Appl. No.: 17/835,701

(22) Filed: Jun. 8, 2022

(65) Prior Publication Data

US 2022/0296974 A1 Sep. 22, 2022

Related U.S. Application Data

(63) Continuation of application No. 16/865,302, filed on May 1, 2020, now Pat. No. 11,395,945.

(60) Provisional application No. 62/920,477, filed on May 1, 2019.

(51) Int. Cl.

| | |
|---|---|
| ***A63B 59/52*** | (2015.01) |
| ***A63B 59/58*** | (2015.01) |
| ***A63B 102/18*** | (2015.01) |
| ***B27M 1/08*** | (2006.01) |
| ***B27M 3/22*** | (2006.01) |

(52) U.S. Cl.

CPC .............. *A63B 59/52* (2015.10); *A63B 59/58* (2015.10); *B27M 1/08* (2013.01); *B27M 3/22* (2013.01); *A63B 2102/18* (2015.10); *A63B 2209/02* (2013.01); *A63B 2209/10* (2013.01)

(58) Field of Classification Search

CPC ......... A63B 59/50; A63B 59/52; A63B 59/58; A63B 2102/18; A63B 2209/02; A63B 2209/10

USPC .......................................................... 473/564

See application file for complete search history.

(56) References Cited

U.S. PATENT DOCUMENTS

| | | | | | |
|---|---|---|---|---|---|
| 1,063,563 | A * | 6/1913 | Cook | A63B 59/50 473/564 |
| 5,114,144 | A * | 5/1992 | Baum | B29C 70/088 473/567 |
| 5,165,686 | A * | 11/1992 | Morgan | A63B 59/50 473/564 |
| 5,303,917 | A * | 4/1994 | Uke | A63B 59/54 473/567 |
| 5,364,095 | A * | 11/1994 | Easton | A63B 59/51 473/566 |
| 5,395,108 | A * | 3/1995 | Souders | A63B 60/08 473/567 |

(Continued)

*Primary Examiner* — Joseph B Baldori
(74) *Attorney, Agent, or Firm* — Device Patent LLC

(57) ABSTRACT

Disclosed herein are various forms of hybrid baseball bats comprising a wood shell having a radial wall and an outer radial surface profile defining a baseball bat. The wood shell having a central core with a central surface thereon extending from a distal end of the bat. The central surface being profiled with a taper that in some embodiments extends entirely through to the proximal end. A fibrous construct is housed in the central core and infiltrated with an epoxy resin. In some forms, the fibrous construct is in the form of a sleeve. Disclosed are various manufacturing techniques for manufacturing hybrid baseball bats including a low pressure bladder method, a high pressure bladder method, and a centrifugal force method.

20 Claims, 11 Drawing Sheets

(56) References Cited

U.S. PATENT DOCUMENTS

| | | | | | |
|---|---|---|---|---|---|
| 5,460,369 | A * | 10/1995 | Baum | B29C 70/086 | 473/567 |
| 5,490,669 | A * | 2/1996 | Smart | F41C 23/18 | 273/266 |
| 5,620,179 | A * | 4/1997 | MacKay, Jr. | A63B 59/52 | 473/564 |
| 5,904,803 | A * | 5/1999 | Hillerich, III | A63B 59/50 | 156/499 |
| 6,007,440 | A * | 12/1999 | Bender | A63B 59/52 | 473/564 |
| 6,139,451 | A * | 10/2000 | Hillerich, III | A63B 59/52 | 473/567 |
| 6,152,840 | A * | 11/2000 | Baum | B29C 70/088 | 473/567 |
| 6,238,309 | B1 * | 5/2001 | Sample | A63B 59/52 | 473/567 |
| 6,352,485 | B1 * | 3/2002 | Philpot | A63B 59/51 | 473/567 |
| 6,425,836 | B1 * | 7/2002 | Misono | A63B 60/14 | 473/566 |
| 6,432,006 | B1 * | 8/2002 | Tribble | A63B 59/50 | 473/566 |
| 6,755,757 | B2 * | 6/2004 | Sutherland | A63B 59/50 | 473/566 |
| 6,767,299 | B1 * | 7/2004 | Chang | A63B 59/52 | 473/519 |
| 6,878,080 | B2 * | 4/2005 | Chang | A63B 59/54 | 473/567 |
| 6,899,648 | B2 * | 5/2005 | Chang | A63B 59/54 | 473/566 |
| 6,929,573 | B1 * | 8/2005 | Chang | A63B 59/50 | 473/566 |
| 6,997,826 | B2 * | 2/2006 | Sutherland | A63B 59/50 | 473/566 |
| 7,011,588 | B2 * | 3/2006 | Fritzke | A63B 59/50 | 473/566 |
| 7,399,242 | B1 * | 7/2008 | Smith | A63B 69/0002 | 473/457 |
| 7,575,527 | B2 * | 8/2009 | Davis | A63B 59/50 | 473/566 |
| 7,699,725 | B2 * | 4/2010 | McNamee | A63B 59/50 | 428/105 |
| 8,029,391 | B2 * | 10/2011 | McNamee | A63B 60/06 | 473/567 |
| 8,113,972 | B2 * | 2/2012 | Dobransky | A63B 59/50 | 473/564 |
| 8,257,207 | B2 * | 9/2012 | Verrengia | B27N 5/00 | 473/564 |
| 8,795,107 | B2 * | 8/2014 | McDonald | A63B 59/52 | 473/564 |
| 8,814,733 | B2 * | 8/2014 | Tsukamoto | A63B 59/54 | 473/566 |
| 8,852,036 | B2 * | 10/2014 | Kuwabara | A63B 59/54 | 473/564 |
| 8,894,518 | B2 * | 11/2014 | Chung | A63B 60/10 | 473/566 |
| 9,056,229 | B2 * | 6/2015 | Hungerbach | A63B 59/50 | |
| 9,138,625 | B2 * | 9/2015 | Chung | A63B 59/52 | |
| 2002/0198071 | A1 * | 12/2002 | Snow | A63B 59/54 | 473/567 |
| 2004/0029660 | A1 * | 2/2004 | Chen | A63B 59/50 | 473/564 |
| 2004/0209716 | A1 * | 10/2004 | Vacek | A63B 59/54 | 473/567 |
| 2005/0070383 | A1 * | 3/2005 | Chang | A63B 59/52 | 473/566 |
| 2005/0070384 | A1 * | 3/2005 | Fitzgerald | A63B 60/00 | 473/567 |
| 2005/0124441 | A1 * | 6/2005 | Botten | A63B 60/00 | 473/564 |
| 2007/0072711 | A1 * | 3/2007 | Mallas | A63B 59/50 | 473/564 |
| 2007/0219026 | A1 * | 9/2007 | Lo | A63B 59/50 | 473/44 |
| 2008/0237937 | A1 * | 10/2008 | Aaron | A63B 59/50 | 473/564 |
| 2009/0275428 | A1 * | 11/2009 | Ikeda | A63B 59/50 | 473/564 |
| 2010/0081525 | A1 * | 4/2010 | Dobransky | A63B 59/52 | 473/564 |
| 2012/0178557 | A1 * | 7/2012 | Tsukamoto | B29C 63/34 | 156/293 |
| 2013/0085022 | A1 * | 4/2013 | Kuwabara | A63B 59/52 | 156/294 |
| 2013/0109512 | A1 * | 5/2013 | Hungerbach | A63B 60/54 | 473/520 |
| 2013/0260926 | A1 * | 10/2013 | Kuwabara | A63B 59/50 | 29/527.2 |
| 2014/0073463 | A1 * | 3/2014 | Chung | A63B 59/52 | 473/564 |
| 2015/0265893 | A1 * | 9/2015 | Ledoux, Jr. | B27M 3/22 | 144/355 |
| 2018/0169491 | A1 * | 6/2018 | Gray | A63B 59/50 | |
| 2020/0070021 | A1 * | 3/2020 | Gray | A63B 60/54 | |
| 2020/0155906 | A1 * | 5/2020 | Marsh | A63B 41/00 | |
| 2025/0213942 | A1 * | 7/2025 | Lightfoot | A63B 59/52 | |

* cited by examiner

FIGURE 18
250
Obtain wood billet, trim to length, cut external bat profile.
252
Cut/drill to form central core and profiled central surface.
254
Roughen central surface.
256
Obtain flexible rod and joiner plug, trim to length.
258
Seat flexible rod end in plug aperture of joiner plug.
260
Obtain formless fiber sleeve sized to house joining plug at one end.
262
Position the joining plug in the internal chamber of fiber sleeve at a proximal end with flexible rod extending proximally.
264
Radially open fiberous sleeve with forming stick then remove forming stick.
266
Slide fiber sleeve, joiner plug-flexible rod assembly into central core of wood shell.
268
Pour epoxy mix down fiber sleeve (or precoat rod and sleeve)
282
Fix end cap with adhesive.
272
Adhere fiber sleeve to central surface of central core by one of a: low pressure bladder method, a high pressure bladder method, and centrifugal force method.
Low Pressure Method
High Pressure Method
Centrifugal Force Method
274
Slide bladder, into internal cavity of fiberous construct (i.e fiberous sleeve).
276
Inflate bladder to low pressure to apply radial force to embed fiber construct in central surface.
284
Place wood shell, core structure & bladder in 1st mold.
285
Mate with second mold form.
286
Inflate bladder to high pressure to apply radial force to embed fiber construct in central surface.
290
Seat wood shell in rotary machine such as lathe.
292
Spin at high RPM for designated time.
278
Epoxy cures. Optional:Apply additional curing measures.
288
Remove bat from mold.
282
Fix end cap with adhesives.
280
Bladder may be removed after curing.

HYBRID BASEBALL BAT AND CONSTRUCTION METHODS

CROSS REFERENCE TO RELATED APPLICATIONS

This Continuation patent application claims priority to Non-Provisional patent application Ser. No. 16/865,302 filed May 1, 2020 which claims the benefit of Provisional Patent Application No. 62/920,477 filed May 1, 2019, the entire disclosures of which are hereby incorporated by reference and relied upon.

BACKGROUND OF THE INVENTION

Field of the Invention

The invention relates generally to baseball bats, and more particularly to high performance baseball bats having a hybrid material construction.

Description of Related Art

Design improvement of the baseball bat has been ongoing since the inception of the game of baseball. Many different design iterations of the baseball bat have come and gone, largely due to innovation but also certification requirements and restriction. The Major League Baseball (MLB) organization will always utilize completely wooden bats since wood bats maintain the historical integrity of the game. However, since the advent of the metal bat in 1924, and in order to help the younger players of the game perform better, materials other than wood have been used to construct a baseball bat. Over the years, the baseball bat has progressed through many phases from aluminum construction; two-piece composite construction, full composite construction, wood plus external composite construction, and wood plus laminated composite construction. As the bat performance increased so did the restrictions. Past restrictions were based on a BESR (Ball Exit Speed Ratio). Due to bats performing better over time, new (and current) standards were adopted for youth (USABat Certification) and Youth to College (BBCOR: Bat-Ball Coefficient of Restitution Certification). These developments have increasingly driven the cost of a baseball bat up, bringing the highest end bats to around $450 as of 2019. Room for an improved bat remains. Although easy for full metal and composite bats, these certification standards are difficult to achieve for wood bats. Wood starting billets that fit these requirements are as much as three times more expensive than a heavier wood billet. Also, in order to meet weight requirements, a 2½" barrel diameter is often used in wood bats. In the current hybrid bat models (ex: Marucci® AP5 Hybrid Pro Model, DeMarini® D110 and D243 Pro Maple Composite, and Axe Bats™ Pro Maple Composite Wood Hybrid L180) the method used to achieve a 2⅝" barrel size while meeting the weight requirements is by use of a two-piece construction including a barrel and a composite handle. This introduces a weak point in the design at the adjoining surfaces.

Higher performing bats in the prior art commonly utilize bat construction having two laminated pieces of wood with pre-made carbon inserts added for strength. This design leads to reduced strength through laminated pieces, weaker sidewalls due to single axis drilling, less weight control due to extraneous material and thus lower baseball rebound and flexibility as the remaining wood limits these qualities. In addition, high performance bats of the prior art commonly utilize a pre-formed approximately 2 inch diameter carbon fiber sleeve which fits only a uniform diameter cylindrically drilled hole down the core of the bat. This design approach creates two main problems in the performance and strength of a hybrid bat. The first problem is strength, since a baseball bat design tapers from at most a 2⅝" OD at the distal end of the bat to a smaller diameter at the thinnest point in the handle. This cylindrical hole creates a concentrated stress point internally which will cause delamination and premature fractures in the bat structure. Additionally, this non-profiled barrel wall thickness introduces a reduction in the 'Sweet Spot' of the bat.

Also noted in hybrid bat designs of the prior art, the internal core responsible for a better sweet spot is relatively small (approximately 6-8" max), This problem is a consequence of the use of a pre-formed cylindrical sleeve. To rectify this problem, additional support is added in the core in order to ensure maximum strength. The additional support adds weight and minimizes the area that the internal chamber can span. This configuration creates a trampoline effect for the baseball to rebound off of upon impact.

Composite bat designs of the prior art are created through a two-piece construction process that joins a handle and barrel. This approach is used to reduce handle vibrations while improving barrel performance. Hybrid bats in the prior art also build bats with two-piece construction, however, their designs require a large amount of internal support and binding to merge the barrel to the handle. Namely, this is done through laminating a complete carbon fiber or plastic handle to the wood barrel portion of the bat. There are many different shortfalls in this approach including the use of extraneous material eliminating full ability over weight distribution and control, discontinuous barrel and handle, prefabricated handle, and minimal bonding surface.

What is needed is a hybrid fusion wood bat having a large barrel (i.e. 2⅝"), is durable, and is a wood composite bat. The needed bat must perform at or near the present BBCOR standard to match composite bats performance all at an affordable price. What is needed is a unique hybrid fused wood/composite bat design and novel methods of manufacturing to create it.

SUMMARY OF THE INVENTION

Disclosed herein are various forms of a novel hybrid baseball bat along with novel methods of construction for the hybrid baseball bat. In preferred forms the novel hybrid baseball bat is compatible with certification requirements established for baseball bats used in competition. Although easy for full metal and composite bats, these certification requirements are difficult to achieve for wood bats. Various forms of the novel hybrid baseball bat described herein remove large amounts of core material from the originating wood billet. Thus, this hybrid fusion bat can also meet USA Bat requirements and reach −10, −8, and −5 drop weights while maintaining the 2⅝" big barrel. Bats disclosed herein are the first to utilize a heavy billet to achieve a −3 (and −5, −8, and −10 drop weight) bat through our material removal processes and have created a bat which has higher wood density and surface hardness. These features translate to greater bat strength and baseball acceleration (rebound) off the bat when used in hitting. A variety of manufacturing methods are introduced which provide improved bat performance compared to inferior manufacturing methods used in the prior art which comprise the method of inserting an already complete handle built from preformed carbon tubes. Manufacturing methods disclosed herein create a continuous internal support, eliminate all extraneous material, and provide for a maximized handle to barrel bonding surface, all of which are novel improvements to the current methods.

Baseball is a historic pastime. Many things make it so, including the smells, atmosphere, tradition, but also the sounds including the crack of a bat upon impact with a baseball. Composite and metal bats of today used in the youth baseball levels cannot recreate that iconic crack. The hybrid baseball bat designs disclosed herein cannot create the exact wood bat sound, however, the disclosed bats have the largest cavity formed inside the barrel of a wood bat. Upon impact with a baseball, this large wood cavity with the internal support as described herein recreates a very similar rich sound of wood bats.

In one form, the hybrid baseball bat comprises a variety of materials including but not limited to wood such as maple and birch.

In one form, the hybrid baseball bat comprises a variety of materials including but not limited to composites such as carbon fiber, resins such as epoxies, fiberglass, and Kevlar.

In one form, the hybrid baseball bat comprises a composite having high strength fibers.

In one form, the hybrid baseball bat comprises an epoxy such as a two-part epoxy to bind high strength fibers to wood.

In one form, the high strength fibers are arranged in a fibrous construct as one or more of the following: a weave, a fibrous sleeve, and a mesh by one or more of spraying and direct fiber arrangement.

In one form, the high strength fibers used in the hybrid bat are arranged as a weave and can be varied in weave type, weave direction, weave thread count, weave thickness, and weave layers to produce a desired hybrid bat performance characteristic such as bat weight, bat center of gravity, bat stiffness, and bat ductility.

In one form, the type of two-part epoxy used in the hybrid bat is varied to produce a desired hybrid bat performance characteristic such as bat weight, bat center of gravity, bat stiffness, and bat ductility.

In one form, a weave formed from high strength fibers is varied in diameter and shape through exertion of one or more of internal and external forces during the hybrid baseball bat manufacturing process.

In one form, a weave formed from high strength fibers is embedded in a wood shell of the hybrid bat by an outward radial force directed from a central axis of a wood shell. In some forms, the outward radial force is due to but not limited to: inflation of a central bladder (also termed expandable bladder or inflatable bladder), and centrifugal force as a consequence of high speed rotation of the wood shell along the central axis.

In one form, the hybrid baseball bat comprises a variety of materials including but not limited to plastics such as acetal, nylon, polymershapes, HDPE (high density polyethylene), Polyvinal, PVC (polyvinyl chloride), and PP (polypropylene).

In one form, a grip encircles a handle portion of the hybrid baseball bat for improved hand placement experience on the bat by a user.

In one form, the grip is in the form of a baseball bat grip tape for circumferentially wrapping around the radial wall of a handle portion or a grip sleeve that is positioned over the handle portion.

In one form, the hybrid baseball bat comprises materials from two or more of the following groups: woods, composites, and plastics.

In one form, the hybrid baseball bat is compatible with BBCOR and USABat certification requirements.

In one form, the hybrid baseball bat comprises: a bat barrel diameter not exceeding 2.625 inches, a length along a central axis ‘A’ not exceeding 34 inches, and a −3 drop weight (DW) as determined from bat length (BL) and weight (W, in ounces) where drop weight is calculated as DW=BL−W. For example, a 34 inch bat at a −3 drop weight weighs 31 ounces.

In one form, the hybrid baseball bat is manufactured from a wood billet that is substantially cylinder shaped.

In one form, the wood billet is greater than 34 inches and a diameter greater than 2.625 inches.

In one form, a wood billet is approximately 37 inches×2.8 inches.

In one form, a wood billet comprises a billet body and a first billet end and a second billet end.

In one form, an outer surface of a billet body is machined to create a profiled radial surface.

In one form, the profiled radial surface comprises an end, a barrel portion, a taper portion, a grip portion, and a knob portion.

In one form, the end is opposite the knob portion and the grip portion is intermediate the knob portion and taper portion.

In one form, the hybrid baseball bat comprises a proximal end where the knob portion terminates, and a distal end where the barrel portion terminates.

In one form, the hybrid baseball bat comprises a wood shell having a central core whereas said central core extends through the entire hybrid baseball bat from a distal end to a proximal end.

In one form, the hybrid baseball bat comprises a wood shell having a blind central core whereas said central core extends from a distal end into a portion of the handle portion.

In one form, the central core does not extend or only partially extends, through one or more of the knob portion and handle portion.

In one form, a central core of the hybrid bat is created by drilling using one or more drill bits leaving a remaining radial wall between the profiled radial surface (or outer surface of a billet body) and central surface.

In one form, the central core is created by a combined series of wood bits that are driven by one or more of a lathe and CNC machine.

In one form, the central core is created by wood bits in a gun drilling machine.

In one form, air pressure is introduced during gun drilling of the central core to remove wood chips and reduce heat build up during cutting operations.

In one form, the wood bits utilized to create the central core include but are not limited to one or more of normal/standard, forstner, gun drill, and CNC cutting bit.

In one form, the central core is profiled to maximize weight reduction and removing the stress concentration limitations of central cores having a constant diameter.

In one form, the central core comprises one or more of a barrel core, a taper core, a handle core, and a knob core formed in each of these respective areas of the hybrid bat.

In one form, the central core is describable in profile as but not limited to: uniform, variable, concave, and negative through any portion of the central core.

In one form, the hybrid baseball bat comprises a core structure comprising at least a plurality of high strength fibers infiltrated with an epoxy.

In one form, the high strength fibers are one of but not limited to carbon fiber, Kevlar, and other high strength materials.

In one form, the hybrid baseball bat comprises one or more centrifugally spun fiber sleeves adhered to the central surface of at least a portion of the central core.

In one form, the fiber sleeve is formed of one or more of carbon fiber, Kevlar, and other high strength materials.

In one form, the hybrid baseball bat comprises a flexible rod housed in the handle core of the handle portion for maximum strength and flexibility.

In one form, the hybrid baseball bat comprises a joining plug internally connecting the flexible rod to the fiber sleeve.

In one form, the hybrid baseball bat comprises a roughened central surface for maximum adhesion of the fiber sleeve.

In one form, the hybrid baseball bat design incorporates a profiled central surface on the radial wall as a base on which the fiber sleeve can adhere.

In one form, the profiled central surface of the radial wall is formed by use of a tapered drill bit driven by a lathe for example, whereby the outer face of the tapered drill bit comprises the complementing central surface contour.

In one form, the profiled central surface of the radial wall is formed by a wood bit driven by a CNC machine programmed to create the tapered profile of the central surface.

In one form, a drill bit extension is utilized along the same axis to drill partially into or through the handle portion of the hybrid baseball bat thereby creating a space to refill with a more flexible material than wood. This flexibility minimizes negative vibrations felt at any point of contact of the baseball on the bat and minimizes handle breakage.

In one form, a CNC lathe is used to shape the central surface of the radial wall based on a programmed profile. This method maximizes the barrel cavity while minimizing stress concentration points in the radial wall.

In one form, the hybrid baseball bat binds a flexible rod in the handle core and whereas a joining plug is fixed to one end of the flexible rod. This configuration maximizes handle portion strength, minimizes pre-mature handle fracture, provides increased handle portion flexibility, and minimizes negative handle vibrations.

In one form, a core structure is housed within the central core and is operable to add strength and support to the wood shell of a hybrid baseball bat.

In one form, the core structure comprises a formless fiber sleeve in a pre-finished configuration.

In one form, the fiber sleeve in the pre-finished configuration is flexible and can expand and contract as necessary to fit the profile of the central core as defined by the profiled central surface.

In one form, at least a portion of the central surface is roughened by one or more operations including but not limited to scouring, grooving, sanding, rifling, and other processes known in the art to ensure the tightest and strongest fit to the bat's internal walls.

In one form, a novel two-piece bat design is built using a bladder molded process. Using this approach, a handle portion of the hybrid baseball bat becomes one piece with the barrel portion. This configuration enhances strength, while maximizing barrel core performance.

In one form, a method of constructing a hybrid baseball bat comprises the following steps. Obtaining a wood billet. Trimming the wood billet to a predetermined length. Forming the profiled central surface of the central core using a machine operation such as one or more of but not limited to: gun drilling, wood bit boring, and drilling with tapered drill bit. Optionally, roughening the central surface by one or more operations such as rifling. Obtaining a flexible rod of a predetermined length and sized for housing in the handle core. Obtaining a joiner plug of a predetermined size for fit into the proximal end of the barrel core of the hybrid baseball bat. Fixing the joiner plug to one end of the flexible rod by inserting the flexible rod end into the plug aperture of the joiner plug. Obtaining a formless fibrous sleeve sized to house the joiner plug therein at one end and positioning the joiner plug in the fiber sleeve accordingly with the remaining flexible rod extending proximally away from the fibrous sleeve. Sliding the fibrous sleeve over the joining plug and attaching the fiber sleeve on an edge at the proximal end of the joining plug. Inserting the fibrous sleeve, joiner plug, and flexible rod assembly into the central core from the distal end. If necessary, radially opening the fibrous sleeve using a forming stick inserted down its internal chamber to approximate the outer face with the central surface of the wood shell. Removing the forming stick. Pouring an epoxy mix down the central core (alternatively, the fibrous sleeve and flexible rod may be pre-wetted with epoxy). Fixing the end cap at the distal end of the central core with adhesive (alternatively, the end cap may be inserted after epoxy curing operations depending on the requirements of the final operations in use). Adhering the fiber sleeve to the central surface of the central core by one of three methods: a low pressure bladder method, a high pressure bladder method, and a centrifugal force method as described in the following paragraphs.

In one form, a method of constructing a hybrid baseball bat comprises the following steps. Obtaining a wood billet. Trimming the wood billet to a predetermined length. Forming the profiled central surface of the central core using a machine operation such as one or more of but not limited to: gun drilling, wood bit boring, and drilling with tapered drill bit. Optionally roughening the central surface by one or more operations such as rifling. Obtaining a formless fibrous sleeve substantially the length of the central core. Inserting the fibrous sleeve into the central core from the distal end of the wood shell and aligning to cover the exposed central surface. If necessary, radially opening the fibrous sleeve using a forming stick inserted down its internal chamber to approximate the outer face with the central surface of the wood shell. Removing the forming stick. Pouring an epoxy mix down the central core (alternatively, the fibrous sleeve and flexible rod may be pre-wetted with epoxy). Fixing the end cap at the distal end of the central core with adhesive (alternatively; the end cap may be inserted after epoxy curing operations depending on the requirements of the final operations in use). Adhering the fiber sleeve to the central surface of the central core by one of three methods: a low pressure bladder method, a high pressure bladder method, and a centrifugal force method as described in the following paragraphs.

In the low pressure bladder method, the process begins with sliding an expandable bladder into the internal chamber of the fibrous construct (i.e. constructed as but not limited to: a weave, sprayed mesh, fibrous mesh, fibrous sleeve). Inflating the bladder thereby applying a low pressure (i.e. 10 psi) radial force that causes a consequent embedding of the fibrous sleeve in the central surface of the central core thus maximizing durability and minimizing potential delamination between the wood shell and sleeve during use (the radial wall operates as the mold walls for the curing fiber sleeve). Applying one or more optional measures such as heat and UV radiation to accelerate quality bonding. Removing the bladder after the epoxy cures. Fixing the end cap at the distal end of the central core with adhesives (if not done earlier). Then forming a preferred external profile of the hybrid bat utilizing a wood bit in a standard or CNC lathe. Alternatively, the step of forming an external profile of the hybrid baseball bat may be completed as an earlier step in the hybrid baseball bat forming process.

In the high pressure bladder method, the process begins with sliding an expandable bladder into the internal chamber of the fibrous construct (i.e. constructed as but not limited to: a weave, sprayed mesh, fibrous mesh, fibrous sleeve). Placing the wood shell with the respective core structure (i.e. fibrous construct, epoxy, flexible rod, joiner plug) into a first mold form having a first hybrid bat cavity and fixably mating with a second mold form having a second hybrid bat cavity. Inflating the bladder thereby applying a high pressure (i.e. 100 psi) radial force that causes a consequent embedding of the fiber sleeve in the central surface of the central core thus maximizing durability and minimizing potential delamination between the wood shell and sleeve during use. Here, the mold forms reinforce the radial wall of the wood shell preventing fracture as a result of the high internal bladder pressure. Applying one or more optional measures such as heat and UV radiation to accelerate quality bonding. Removing the hybrid baseball bat from the mold after the epoxy cures. Removing the expandable bladder after the epoxy cures. Fixing the end cap at the distal end of the central core with adhesives (if not done earlier). Then, forming a preferred external profile of the hybrid bat utilizing a wood bit in a standard or CNC lathe. Alternatively, the step of forming an external profile of the hybrid baseball bat may be completed as an earlier step in the hybrid baseball bat forming process.

The centrifugal force method begins with seating the wood shell with the respective core structure (i.e. fibrous construct, epoxy, flexible rod, joiner plug) into a rotary machine such as a lathe and spinning the wood shell with core structure at a high RPM to capture the effects of centrifugal force which propels mass (fibrous construct and epoxy-resin) in an outward direction embedding them into the central surface of the radial wall thereby maximizing durability and minimizing any prospect of delamination. As one example, the wood shell with core structure is spun for 5 minutes at approximately 1,800 rpms and then at 50 rpms until fully cured. The centrifugal method can also incorporate the step of applying one or more additional measures such as heat and UV light to accelerate curing. Then forming a preferred external profile of the hybrid bat utilizing a wood bit in standard or CNC lathe. Alternatively, the step forming an external profile of the hybrid baseball bat may be completed as an earlier step in the hybrid baseball bar forming process.

In one form, the central axis of the wood shell is substantially horizontal during spinning when using the centrifugal force method.

In one form, a combination of a centrifugal method and a bladder method may be used in the manufacture of a hybrid baseball bat.

In one form, and as would be recognized by one skilled in the art, various steps described herein for manufacture of a hybrid baseball bat can be rearranged in order where appropriate to obtain a similar result.

In one form, the fibrous sleeve is substantially tube shaped although formless in that its form can be readily manipulated by the application of minimal forces such as one or more of: centrifugal forces, forces from an expandable bladder, and forces from a elongate forming stick.

In one form, the fibrous sleeve is has a tapered diameter that is substantially 2 inches in diameter in a barrel portion and substantially 0.5 inches in diameter in a handle portion and tapering between these two diameters in a taper portion.

In one form, the fibrous sleeve has a bi-axial weave pattern.

In one form, the fibrous sleeve has a stiffness like a hollow rope.

In one form, the fibrous construct is formed by utilizing a spray head to spray a mix of high strength fibers and epoxy on to the central surface of the central core forming a high strength core structure that is embedded in the wood shell upon curing.

In one form, the thickness of the radial wall of the wood shell is about 0.3 inches in the barrel portion and about a minimum of 0.21 inches in the handle portion.

In one form, one or more of the radial surfaces, end cap, and proximal end of the hybrid bat are finished with one or more of stains and sealants preferably after completion of other hybrid baseball bat forming operations.

In one form, the hybrid baseball bat comprises a two-piece design comprising a handle segment and a barrel segment.

In one form, the hybrid baseball bat comprises a wood shell barrel portion joined to a composite molded handle having mechanical undercuts extending into the exterior surface of the molded handle from a distal end. The proximal end of the wood shell is positioned to overlap the mechanical undercuts and fixed with epoxy. In some forms, a fiber weave infiltrated with epoxy then overlaps the junction of the handle portion and barrel portion whereby the proximal end of the wood shell is secured by composites covering both the central surface and radial surface of the radial wall.

In one form, a method for a two-piece bat construction comprises the following steps. Obtaining a wood billet. Trimming the wood billet to a predetermined length. Forming a preferred external profile of the barrel of the wood shell utilizing a wood bit in standard or CNC lathe. Using a wood bit such as a gun drill hit and/or tapered drill bit to form the profiled central surface of the central core of the barrel. Roughening the central surface by one or more operations. If desired, using a fiber sleeve approach as previously described for formation on a central surface of the barrel core by using either the centrifugal method or the bladder method. Placing the band portion into a two-piece heated mold filled with precut carbon fiber layers on both sides of the narrowing end of the barrel such that the carbon fiber layer extends into the inside of the barrel of the bat to either develop the internal wall or to bond to the existing internal spun wall. Placing a predefined molding bladder into the negative cavity of the bat, partially in the barrel cavity and into the space in the mold for the molded bladder. Closing and securing the mold. Heating and filling the mold with compressed air consequently providing outward force to first bond the carbon fiber completely with the barrel and shape the handle.

In one form, the improved manufacturing methods described herein produce a wood shell having an enlarged central core that is consequently lighter in weight. Also consequently, material is then added back into the wood bat to reinforce highest stress areas and to meet regulatory weight specifications for certifying bodies such as BBCOR.

In one form, material added to the hybrid bat are adhesive materials reinforcing highest stress areas of the bat such as the handle portion and end cap.

In one form, the hybrid baseball bat design comprises an internally profiled wooden bat and one or more of: uniform radial wall thickness, variable radial wall thickness, tapered wall design, a variable thickness woven reinforcing internal structure to adhere to the internally profiled wooded bat, a continuous fiber weave extending through at least the handle portion and the barrel portion, and previously mentioned design features.

In one form, a hybrid baseball bat comprises a profiled central surface of varying diameters extending between the opposing ends of its wood shell.

In one form, the profiled central surface of varying diameters is absent of steps in the central surface.

In one form, the central core of a hybrid bat is reinforced using one or more of a fiber sleeve and fiber weave having a variable thickness.

In one form, the central core of a hybrid bat is reinforced using one or more of a fiber sleeve and fiber weave having a variable weave density.

In one form, the fiber sleeve and fiber weave are manufactured from a wide range of high strength materials.

In one form, a hybrid baseball bat comprises a profiled central surface of varying diameters extending between the opposing ends of its wood shell and further comprises a matching variable diameter composite fiber weave or fiber sleeve. This combination minimizes stress point concentrations.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, wherein cross-sectional views are from a plane extending through a central axis, and wherein.

DETAILED DESCRIPTION OF SELECTED EMBODIMENTS OF THE INVENTION

Select embodiments of the invention will now be described with reference to the Figures. Like numerals indicate like or corresponding elements throughout the several views and wherein various embodiments are separated by letters (i.e. 100, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Figure 2:
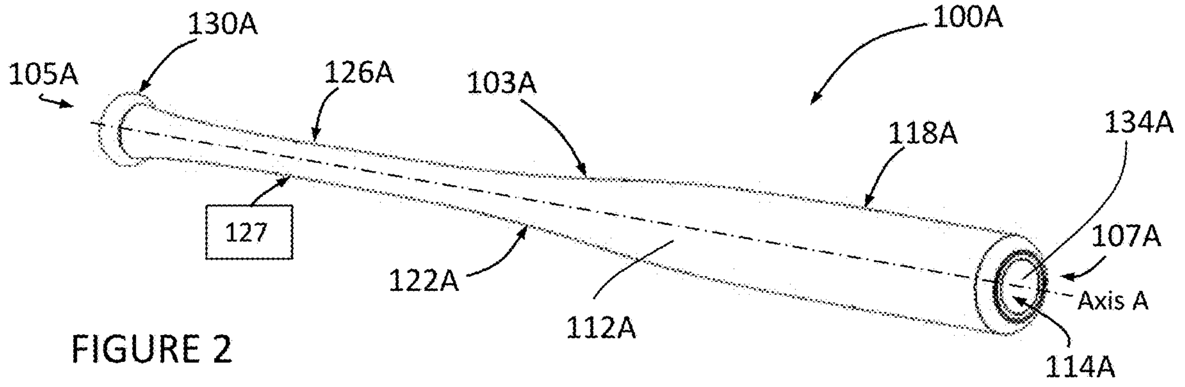
FIG. 2 depicts a perspective view of a hybrid baseball bat.
Figure 13:
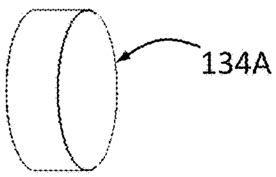
FIG. 13 depicts a perspective view of an end cap used for the enclosing the central core at the distal end of a hybrid baseball bat.

FIG. 2 illustrates one embodiment of the article of invention before placement of optional grip 127 and application of final wood sealants. Hybrid baseball bat 100A is illustrated in an otherwise finished configuration comprising a wood shell 103A, a radial surface 112A on the wood shell, an enlarged knob portion 130A at a proximal end 105A, an enlarged barrel portion 118A at a distal end 107A, and a taper portion 122A intermediate the handle portion 126A and barrel portion 118A. An end cap 134A seals the distal end (also FIG. 13). A core structure 140A (FIG. 8) housed in a central core 114A reinforces the wood shell 103A. The hybrid baseball bat comprises a variety of materials including but not limited to wood such as maple and birch utilized in the wood shell 103A. The hybrid baseball bat 100A can comprise a variety of materials including but not limited to composites such as carbon fiber, resin, fiberglass, and Kevlar. In this embodiment, the core structure 140A comprises a carbon fiber sleeve with a cured two-part epoxy.

Figure 3A:
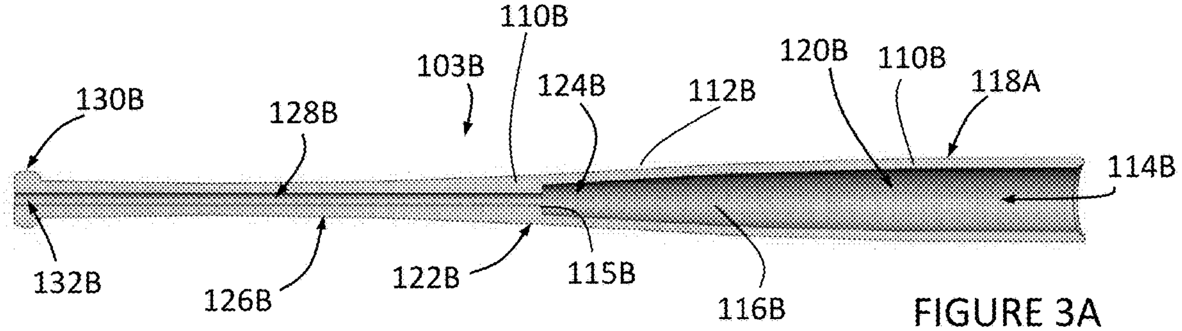
FIG. 3A depicts a cross-sectional view through a central axis of a wood shell of a hybrid baseball bat.
Figure 3B:
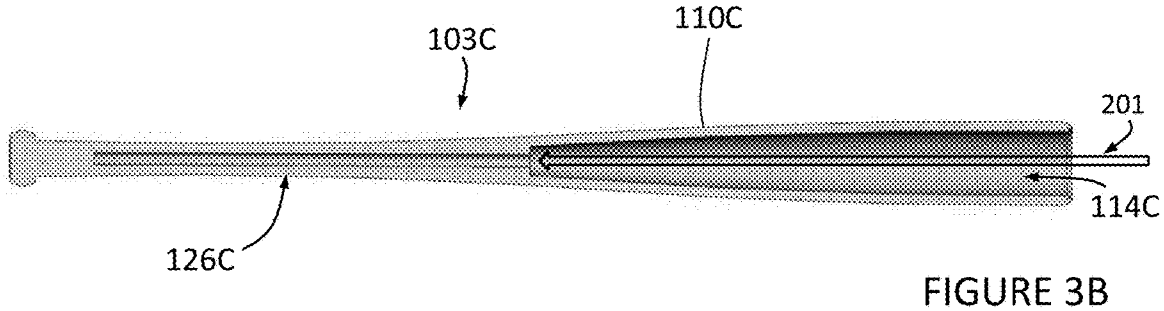
FIG. 3B depicts a cross-sectional view through a central axis of a wood shell of a hybrid baseball bat.

The central core 114B in some embodiments extends the entire length of a wood shell 103B from a proximal end to a distal end as illustrated in FIG. 3A whereas in other embodiments, the central core 114C only extends partially into the handle portion 126C as illustrated in FIG. 3B or alternatively only into the barrel portion and taper portion. The barrel portion, taper portion, handle portion and knob portions each have a respective core portion in the central core 114B and are thus termed a barrel core 120B, a taper core 124B, a handle core 128B, and a knob core 132B. Central core 114B comprises a profiled central surface 116B defining central core 114B. The profiled central surface 116B and radial surface 112B define a radial wall 110B extending therebetween and forming wood shell 103B.

Figure 1:
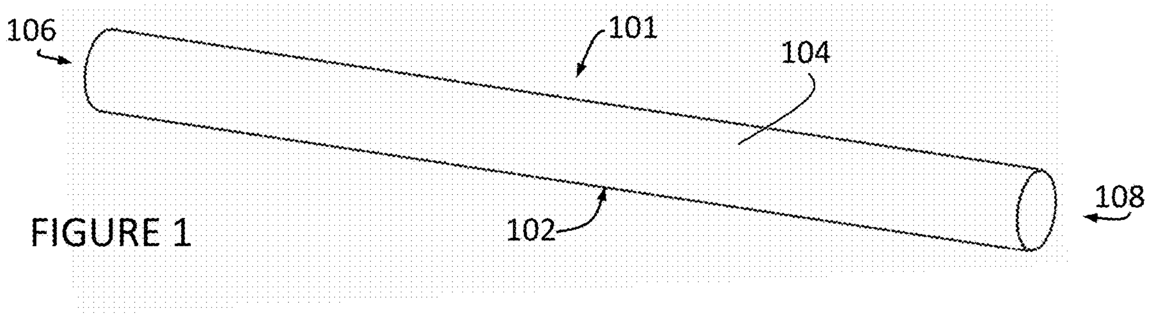
FIG. 1 depicts a perspective view of a wood billet utilized in the manufacture of a hybrid baseball bat.

In preferred embodiments, the hybrid baseball bats disclosed are manufactured from a wood billet 101 that is substantially cylinder shaped as illustrated in FIG. 1. Here, the wood billet is greater than 34 inches long with a diameter greater than 2.625 inches and preferably wood billet 101 is approximately 37 inches×2.8 inches. The wood billet 101 comprises a billet body 102 with an outer surface 104 and has a first billet end 106 and a second billet end 108. The outer surface 104 of the billet body is machined to create a profiled radial surface recognizable to baseball bats with maximum diameter in the barrel portion and a minimum diameter in the handle portion.

Figure 4:
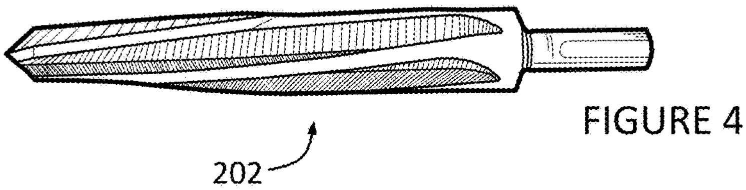
FIG. 4 depicts a side view of a tapered drill bit utilized for creating a profiled central core in a wood shell of a hybrid baseball bat.
Figure 5:
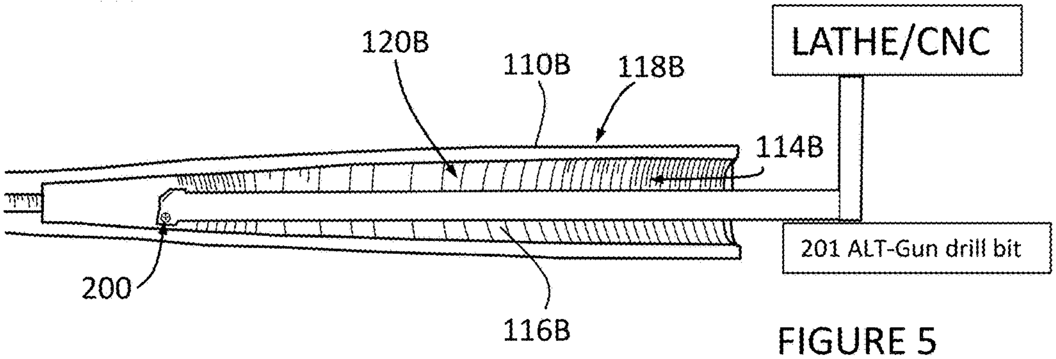
FIG. 5 depicts a side cross-sectional view of a wood bit utilized to create a profiled central core in a wood shell of a hybrid baseball bat.

In some embodiments, the central core of the hybrid baseball bat is created by drilling using one or more drill bits such as the tapered drill bit 202 illustrated in FIG. 4. Note that the outer cutting surface of the tapered drill bit varies in diameter forming a profiled central surface 116B. Radial wall 1108 remains between the outer profiled radial surface 112B and central surface 116B. Alternatively, the central core 114B is created by a one or more wood bits 200 that are driven by one or more of a lathe and CNC machine as illustrated in FIG. 5. In other embodiments, the central core is created by gun drill wood bits 201 advanced in a gun drilling machine. Air pressure can be introduced during gun drilling of the central core to remove wood chips and reduce heat buildup during cutting operations. Wood bits 200 utilized to create the central core include but are not limited to one or more of normal/standard, forstner, gun drill, and CNC cutting bit. The central core is describable in profile as but not limited to: uniform, variable, concave, and negative through any portion of the central core.

Figure 6:
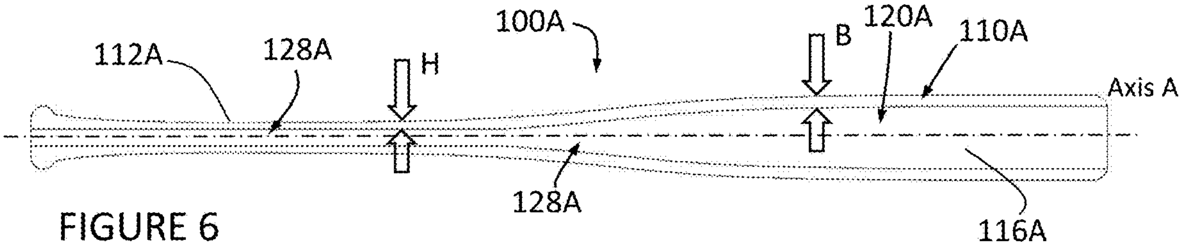
FIG. 6 depicts a side cross-sectional view of a wood shell of the hybrid baseball bat of FIG. 2.
Figure 7:
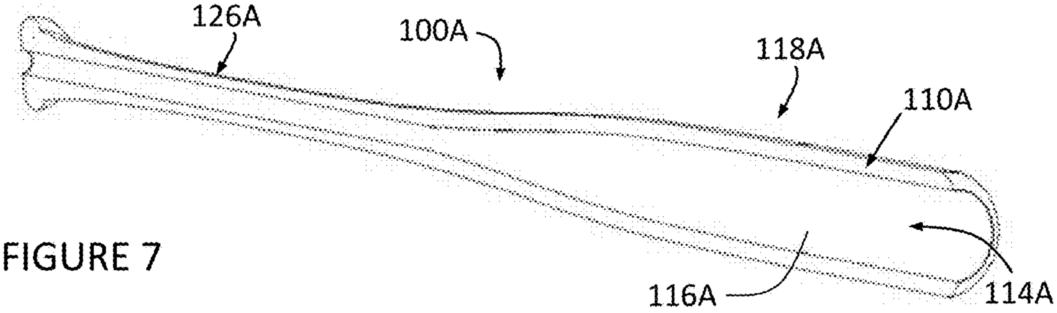
FIG. 7 depicts a perspective cross-sectional view of the wood shell of the hybrid baseball bat of FIG. 2.
Figure 8:
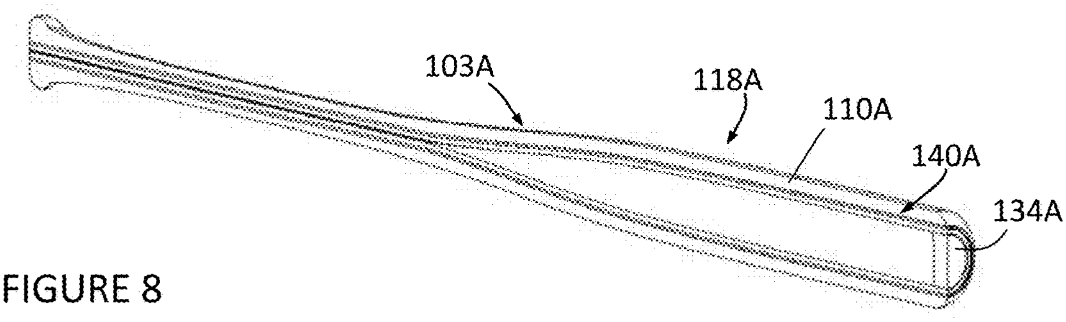
FIG. 8 depicts a perspective cross-sectional view of the hybrid baseball bat of FIG. 2.

In some embodiments such as illustrated in FIG. 6-8, central surface 116A and radial surface 112A are profiled such that each surface of the wood shell is continuous and absent of obvious steps except for at the junction of the knob portion and handle portion on the radial surface. Comparatively, note step 115B in FIG. 3A illustrating an interrupted central surface. In this embodiment (FIG. 6), the radial wall thickness in the wood shell is substantially uniform with slight variation between the radial wall thickness in the barrel portion (B) which measures about 0.3 inches and the radial wall thickness in the handle portion (H) which measures about 0.21 inches. In other embodiments, the central surface is profiled to provide a consequent variable radial wall thickness, tapered wall design.

Figure 9:
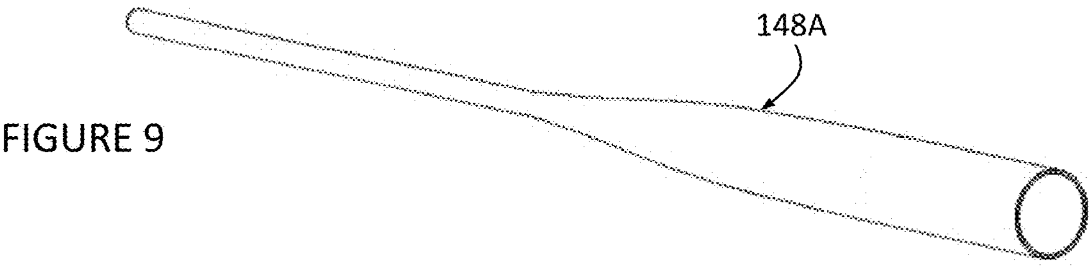
FIG. 9 depicts a perspective view of the two-part epoxy layer of the hybrid baseball bat of FIG. 2.
Figure 10:
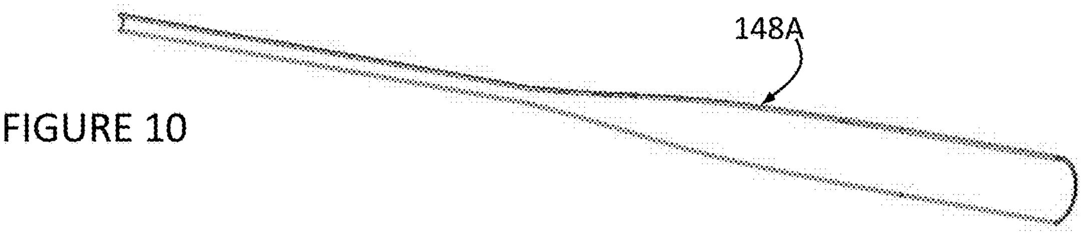
FIG. 10 depicts a cross-sectional perspective view through a central axis of the two-part epoxy layer of the hybrid baseball bat of FIG. 2.
Figure 11:
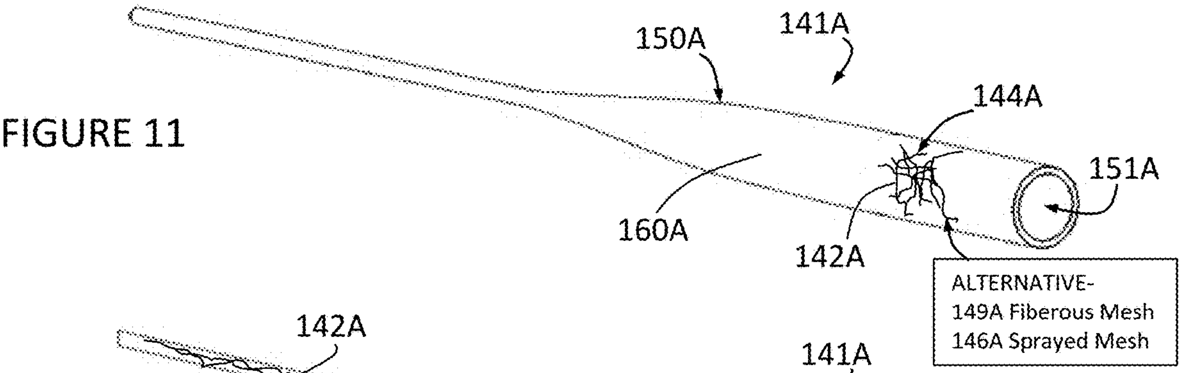
FIG. 11 depicts a perspective view of the fibrous construct of the hybrid baseball bat of FIG. 2.
Figure 12:
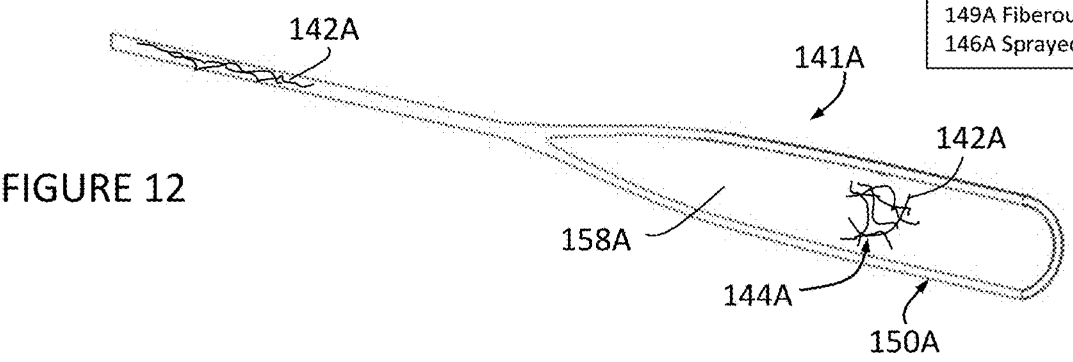
FIG. 12 depicts a cross-sectional perspective view through a central axis of the fibrous construct of the hybrid baseball bat of FIG. 2.

FIGS. 9-12 illustrates various layers of a core structure of the hybrid baseball bat 100A illustrated in FIGS. 2 and 8. FIGS. 9-10 represents the two-part epoxy 148A layer which in an un-finished configuration is uncured and infiltrates fibrous construct 141A and bonds to the central surface 116A of the radial wall 110A of wood shell 103A before curing in place in a finished configuration. The fibrous construct 141A comprises a plurality of high strength fibers

142A in the form of a weave 144A which can have general shape manipulated for use in the central core. In preferred embodiments for example, the fibrous construct 141A is in the form of a fibrous sleeve 150A having an outer face 160A and an inner face 158A defining an internal chamber 151A. The fibrous sleeve can have a bi-axial weave pattern. The high strength fibers 142A used in the hybrid baseball bat 100A are arranged and can be varied in weave type, weave direction, weave thread count (density), weave thickness, and weave layers to produce a desired hybrid bat performance characteristic such as bat weight, bat center of gravity, bat stiffness, and bat ductility. Further each of these weave parameters can be varied depending on the location. For example only, the weave thickness may be greater in the barrel portion as compared to the handle portion. The hybrid bat illustrated in FIG. 6 comprises a much larger diameter barrel core 120A compared to the handle core 128A. The corresponding fibrous sleeve used in this bat is substantially 2 inches in diameter in a barrel portion and substantially 0.5 inches in a handle portion of the sleeve and tapering between these two diameters in a taper portion 122A.

Fibrous construct 141A can be manufactured from a variety of high strength fibers not limited to carbon fiber and Kevlar. In alternative forms, the fibrous construct 141A is in the form of a fibrous mesh 149A such as a sprayed mesh 146A formed by utilizing a spray head to spray a mix of high strength fibers and epoxy mix on to the central surface of the central core forming a high strength core structure that is embedded in the wood shell upon curing. Other variations include varying types of two-part epoxy 148A used in the hybrid baseball bat 100A to produce a desired hybrid bat performance characteristic such as bat weight, bat center of gravity, bat stiffness, and bat ductility.

A weave 144A formed from high strength fibers 142A is varied in diameter and shape through exertion of one or more of internal and external forces during the hybrid baseball bat manufacturing process. For example, fibrous sleeve 150A, with an initial stiffness like a hollow rope, can begin 'formless' or otherwise in the shape of a flattened tube in an unfinished configuration before opened and expanded to its final cylindrical tube form inside the central core 114A of the hybrid baseball bat 100A in a finished configuration. The aforementioned forces cause the weave 144A to be embedded in wood shell 103A of the hybrid bat by an outward radial force directed from a central axis (axis A). These outward radial forces can be due for example from one or more of: a forming stick 162 pushed down the internal chamber 151A, inflation of an expandable bladder inside the central chamber, and centrifugal force as a consequence of high speed rotation of the wood shell along the central axis. Forming stick 162 in preferred forms is an elongate cylindrical bar made of wood or plastic.

FIGS. 14-17 illustrates from a cross-sectional view one embodiment of a hybrid baseball bat with internal core structure 140C. The core structure is operable to add strength and support to the wood shell 103C of the hybrid baseball bat. The core structure 140C comprises a flexible rod 154C with a distal end of the flexible rod housed in the plug aperture 153C of a joiner plug 152C. The joiner plug 152C resides in the proximal end of the internal chamber 151C of fibrous sleeve 150C which is infiltrated with two-part epoxy 148C. The core structure (flexible rod, joiner plug, fibrous sleeve infiltrated with epoxy) is housed in the central core 114C of wood shell 103C (FIG. 3B). This configuration maximizes handle portion strength, minimizes pre-mature handle fracture, provides increased handle portion flexibility, and minimizes negative handle vibrations.

Figure 14:
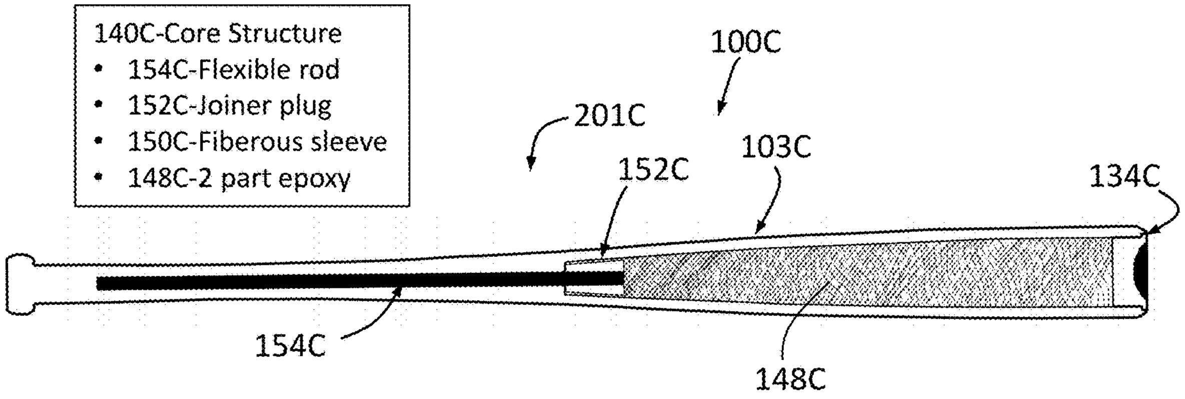
FIG. 14 depicts a side cross-sectional view of a hybrid baseball bat utilizing a flexible rod and joiner plug.
Figure 15:
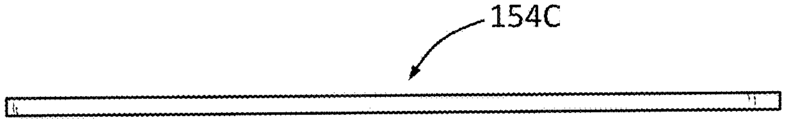
FIG. 15 depicts a side view of a flexible rod utilized in the hybrid baseball bat of FIG. 14.
Figure 16:
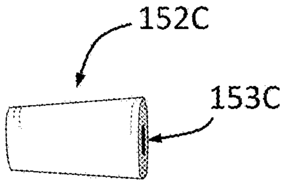
FIG. 16 depicts a side view of a joiner plug utilized in the hybrid baseball bat of FIG. 14.
Figure 17:
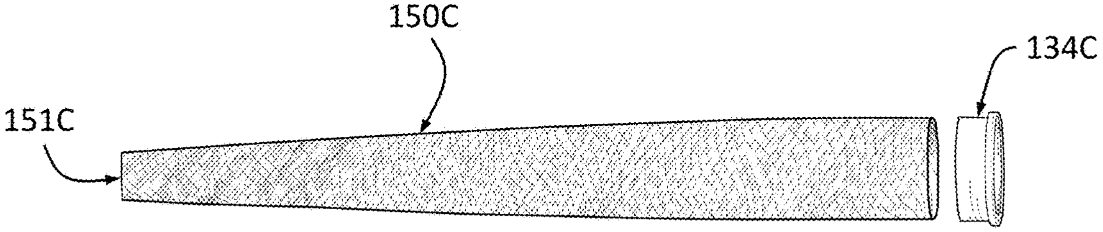
FIG. 17 depicts a side view of a fibrous sleeve and end cap utilized in the hybrid baseball bat of FIG. 14.

Joiner plug 152C has an outer surface sized and shaped for seating at the proximal end of barrel core 120C. In this embodiment, joiner plug 152C is substantially conical shaped whereas plug aperture 153C is a cylindrical through hole extending through the central axis of the plug. In a finished configuration, a portion of fibrous sleeve 150C is sandwiched between central surface 116C and the outer surface of the joiner plug 152C as illustrated in FIG. 14.

Figure 19:
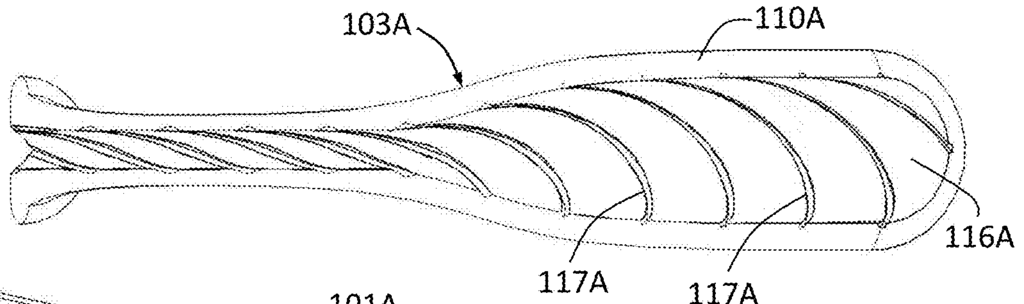
FIG. 19 depicts a perspective cross-sectional view of a wood shell with roughened central surface.

As noted in earlier embodiments, core structure 1400 comprises a formless fiber sleeve in a pre-finished configuration that is flexible and can expand and contract as necessary to fit the profile of the central core as defined by the profiled central surface 116C, Optionally, a portion of central surface 116C is roughened by one or more operations including but not limited to scouring, grooving, sanding, rifling, and other processes known in the art to ensure the tightest and strongest fit and adhesion to the bat's internal walls. Roughening 117A by rifling of a central surface is illustrated in FIG. 19.

As noted in FIGS. 3A, 3B, and 6, the wood shell incorporates a profiled central surface on the radial wall as a base on which the fiber sleeve can adhere. The profiled central surface of the radial wall can be formed by a variety of operations. For example, a tapered drill bit 202 introduced on a lathe may be used to form central core 114 (FIG. 4). The outer face of the tapered drill bit comprises the complementing central surface contour to create the barrel core. Alternatively, the profiled central surface 116B of the radial wall 110B is formed by a wood bit 200 driven by a CNC machine programmed to create the tapered profile of the central surface as illustrated in FIG. 5. The CNC lathe is used to shape the central surface of the radial wall based on a programmed profile. This method maximizes the barrel cavity while minimizing stress concentration points in the radial wall. In addition, a drill bit extension can be utilized along the same axis to drill partially into or through the handle portion of the hybrid baseball bat thereby creating a space to refill with a more flexible material than wood. This flexibility minimizes negative vibrations felt at any point of contact of the baseball on the bat and minimizes handle breakage.

Figure 18:
FIG. 18 depicts a flow chart view of various methods of manufacturing a hybrid baseball bat.

In one form, a method of constructing a hybrid baseball bat 100C (FIG. 14) comprises the following steps (FIG. 18) with each step listed in (XXX). Obtaining a wood billet sufficient in length to make a one piece full length wood shell (i.e. knob to end cap). Trimming the wood billet to a predetermined length and cutting the external bat profile into the radial surface (250) (cutting profile can be delayed until the end). Forming the profiled central surface of the central core using a machine operation such as one or more of but not limited to: gun drilling, wood bit boring, and drilling with tapered drill bit (252). Optionally, roughening the central surface by one or more operations such as rifling (254). Obtaining a flexible rod of a predetermined length and sized for housing in the handle core. Obtaining a joiner plug of a predetermined size for fit into the proximal end of the barrel core of the hybrid baseball bat (256). Fixing the joiner plug to one end of the flexible rod by inserting the flexible rod end into the plug aperture of the joiner plug (258). Obtaining a formless fibrous sleeve sired to house the joiner plug therein at one end (260) and positioning the joiner plug in the fiber sleeve accordingly with the remaining flexible rod extending proximally away from the fibrous sleeve. Sliding the fibrous sleeve over the joining plug and attaching the fiber sleeve on an edge at the proximal end of the joining plug. Inserting the fibrous sleeve, joiner plug, and flexible rod assembly into the central core from the distal end (262).

If necessary, radially opening the fibrous sleeve using a forming stick inserted down its internal chamber to approximate the outer face with the central surface of the wood shell. Removing the forming stick (264). Sliding the fiber sleeve, joiner plug and flexible rod assembly into central core of the wood shell. (266). Pouring an epoxy mix down the central core (alternatively, the fibrous sleeve and flexible rod may be pre-wetted with epoxy) (268). Fixing the end cap at the distal end of the central core with adhesive (alternatively, the end cap may be inserted after epoxy curing operations depending on the requirements of the final operations in use). Adhering the fiber sleeve to the central surface of the central core by one of three methods: a low pressure bladder method, a high pressure bladder method, and a centrifugal force method (272) as described in the following paragraphs (272).

Figure 18B:
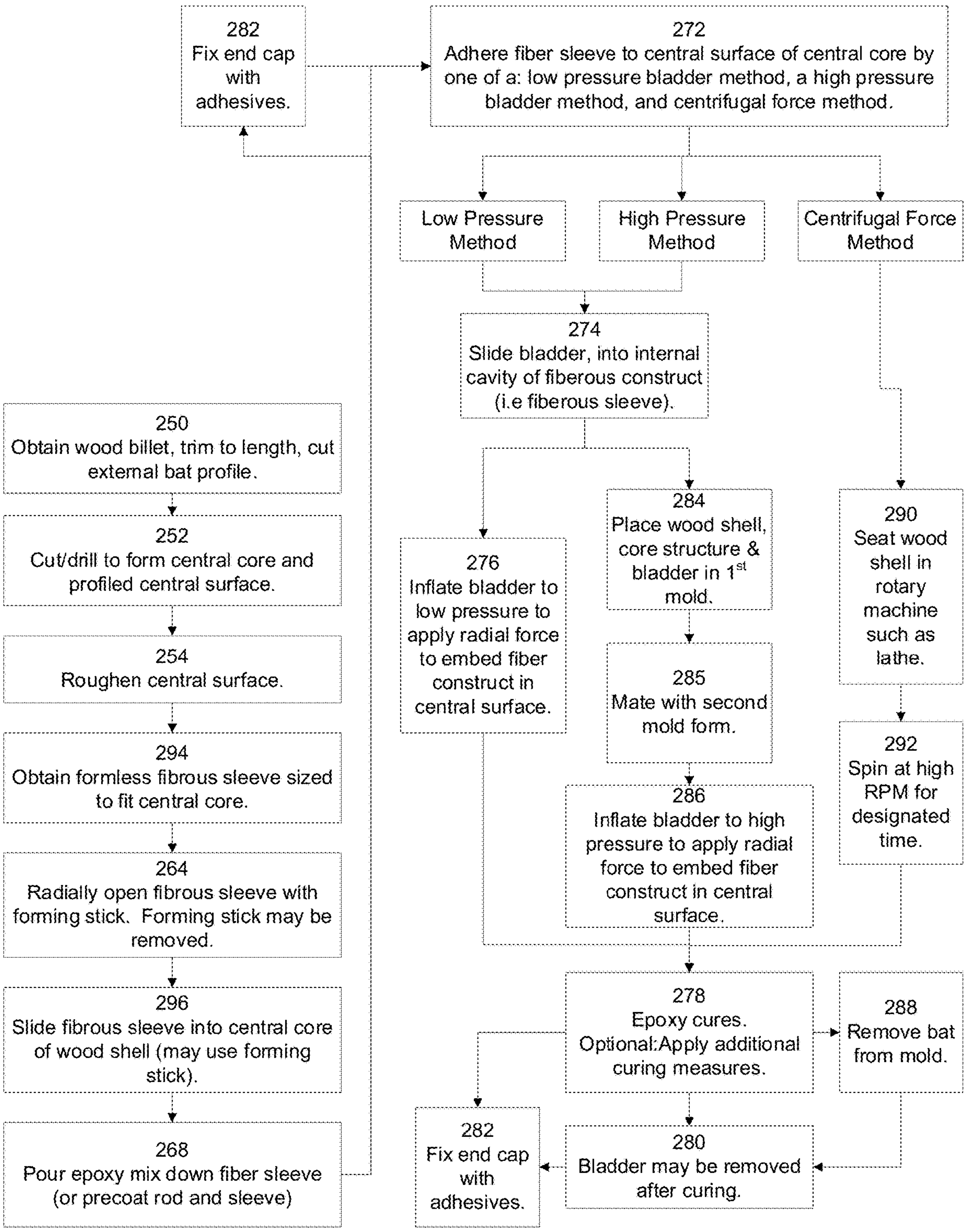
FIG. 18B depicts a flow chart view of various methods of manufacturing a hybrid baseball bat.

In one form, a method of constructing a hybrid baseball bat 100A. (FIG. 2, 8) comprises the following steps (FIG. 18B) with each step listed in (XXX) form. Obtaining a wood billet sufficient in length to make a one-piece full length wood shell. Trimming the wood billet to a predetermined length and cutting the external bat profile into the radial surface (250) (cutting profile can be delayed until the end). Forming the profiled central surface of the central core using a machine operation such as one or more of but not limited to: gun drilling, wood bit boring, and drilling with tapered (hill bit (252). Optionally roughening the central surface by one or more operations such as rifling (254). Obtaining a formless fibrous sleeve substantially the length of the central core (294). If necessary, radially opening the fibrous sleeve using a forming stick inserted down its internal chamber to approximate the outer face with the central surface of the wood shell (264). Inserting the fibrous sleeve into the central core from the distal end of the wood shell and aligning to cover the exposed central surface (296). Removing the forming stick if not already removed. Pouring an epoxy mix down the central core (268) (alternatively, the fibrous sleeve may be pre-wetted with epoxy). Fixing the end cap at the distal end of the central core with adhesive (282) (alternatively, the end cap may be inserted after epoxy curing operations depending on the requirements of the final operations in use). Adhering the fiber sleeve to the central surface of the central core by one of three methods: a low pressure bladder method, a high pressure bladder method, and a centrifugal force method as described in the following paragraphs (272).

In the low pressure bladder method (FIG. 18, 18B), the process begins with sliding an expandable bladder into the internal chamber of the fibrous construct (274). Inflating the bladder thereby applying a low pressure (i.e. 10 psi) radial force (276) that causes a consequent embedding of the fiber sleeve in the central surface of the central core thus maximizing durability and minimizing potential delamination between the wood shell and sleeve during use. Using this method, the radial wall operates as the mold walls for the curing fibrous construct (i.e. fiber sleeve). Applying one or more optional measures such as heat and UV radiation to accelerate quality bonding (278). Removing the bladder after the epoxy cures (280). Fixing the end cap at the distal end of the central core with adhesives. Then forming a preferred external profile of the hybrid bat utilizing a wood bit in a standard or CNC lathe. Alternatively, the step of forming an external profile of the hybrid baseball bat may be completed as an earlier step in the hybrid baseball bat forming process.

Figure 34:
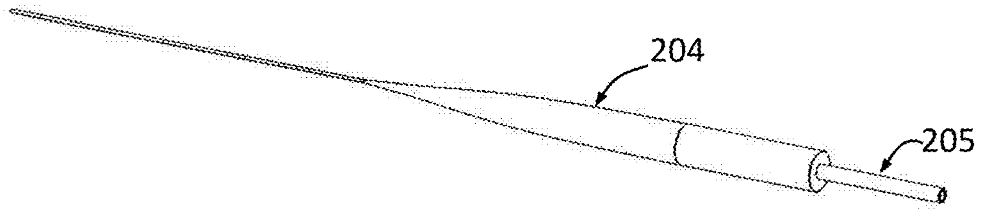
FIG. 34 depicts a perspective view of an inflatable bladder during the course of manufacture using a low pressure method.
Figure 35:
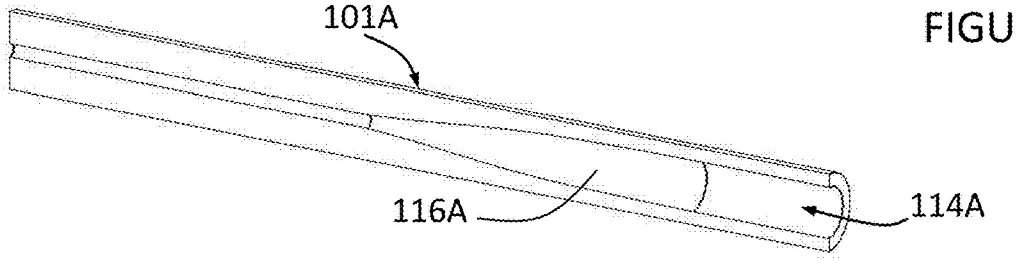
FIG. 35 depicts a perspective cross-sectional view of a hybrid baseball bat during the course of manufacture using a low pressure method.
Figure 36:
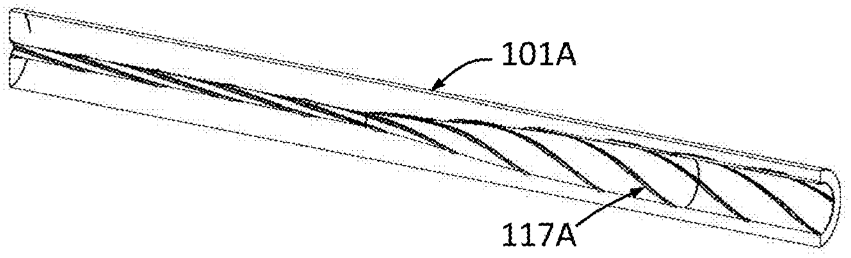
FIG. 36 depicts a perspective cross-sectional view of a hybrid baseball bat during the course of manufacture using a low pressure method.
Figure 37:
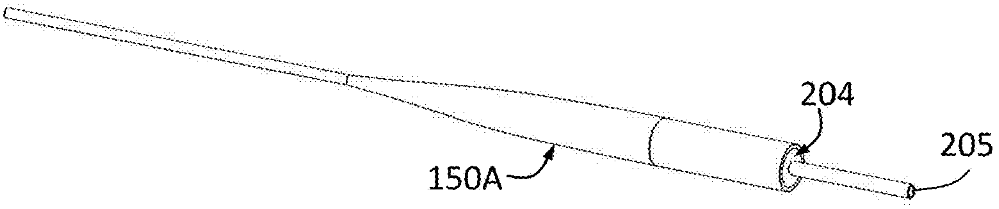
FIG. 37 depicts a perspective view of a fibrous sleeve and inflatable bladder during the course of manufacture using a low pressure method.
Figure 38:
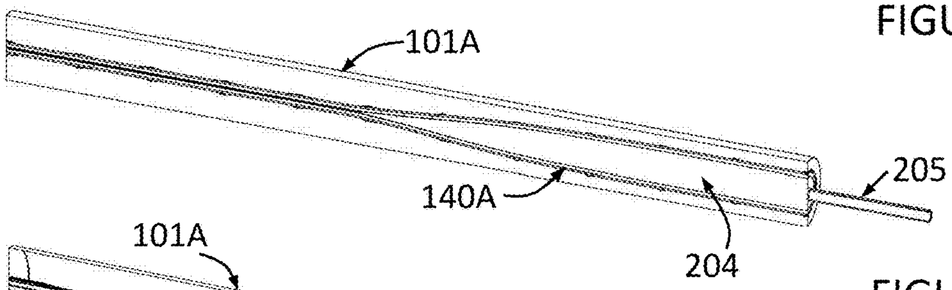
FIG. 38 depicts a perspective cross-sectional view of a hybrid baseball bat during the course of manufacture using a low pressure method.
Figure 39:
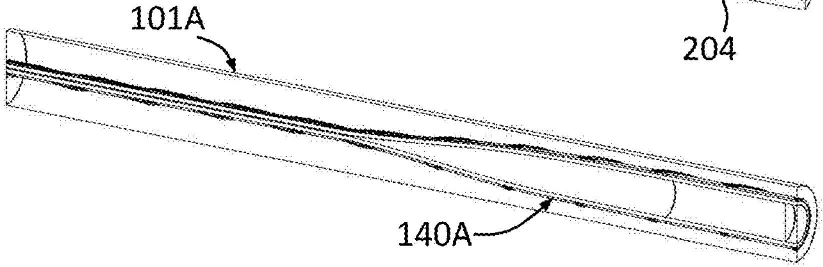
FIG. 39 depicts a perspective cross-sectional view of a hybrid baseball bat during the course of manufacture using a low pressure method.
Figure 40:
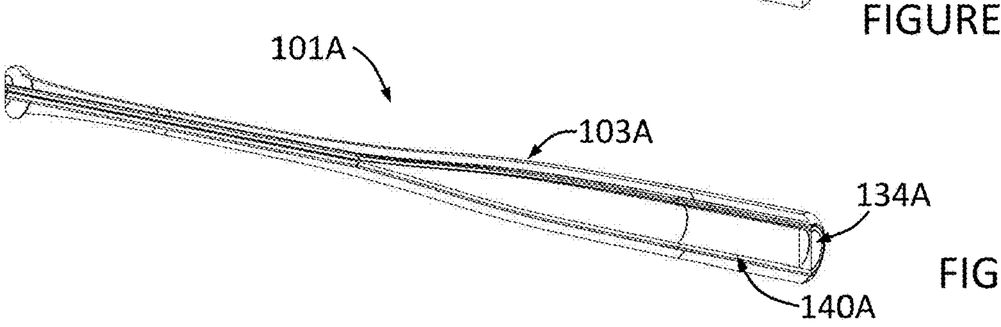
FIG. 40 depicts a perspective cross-sectional view of a hybrid baseball bat during the course of manufacture using a low pressure method.

FIGS. 35-40 depict cross-sectional views of a hybrid baseball bat during various stages of manufacturing using the low pressure bladder method. FIG. 34 illustrates one form of an inflatable (expandable) bladder 204 utilized in the hybrid baseball bat forming operations. On one end is an inlet 205 for inflating and deflating the bladder. Note that the bladder has an external contour of varied diameters for fit into the central core 114A of wood billet 101A (termed a wood billet vs a wood shell due to delayed cutting of external profile). FIG. 35 illustrates a wood billet 101A after gun drilling the central core and with the optional step of roughening 117A the central surface in FIG. 36. In FIG. 37 the fibrous sleeve 150A is pulled over the inflatable bladder and infiltrated with 2-part epoxy 148A. The fibrous sleeve and bladder are inserted into the central core then the bladder inflated to a low pressure (FIG. 38). Heat and pressure may be applied until fully cured. The bladder is deflated and removed (FIG. 39). The end cap is put in place, trimmed, and radial surface 112A profiled.

In the high pressure bladder method (FIG. 18, 18B), the process begins with sliding an expandable bladder into the internal chamber of the fibrous construct (274). Placing the wood shell with core structure (i.e. fibrous construct, epoxy, flexible rod, joiner plug) into a first mold form 210 having a first hybrid bat cavity 211 (284) and fixably mating with a second mold form 212 having a second hybrid bat cavity 213 (285). Inflating the bladder thereby applying a high pressure (286) (i.e. 100 psi) radial force that causes a consequent embedding of the fiber sleeve in the central surface of the central core thus maximizing durability and minimizing potential delamination between the wood shell and sleeve during use. Here, the mold forms reinforce the radial wall of the wood shell preventing fracture as a result of the high internal bladder pressure. Applying one or more optional measures such as heat and UV radiation to accelerate quality bonding (278). Removing the hybrid baseball bat from the mold after the epoxy cures (288). Removing the expandable bladder after the epoxy cures (280). Fixing the end cap at the distal end of the central core with adhesives (282). Then, forming a preferred external profile of the hybrid bat utilizing a wood bit in a standard or CNC lathe. Alternatively, the step of forming an external profile of the hybrid baseball bat may be completed as an earlier step in the hybrid baseball bat forming process (250).

Figure 41:
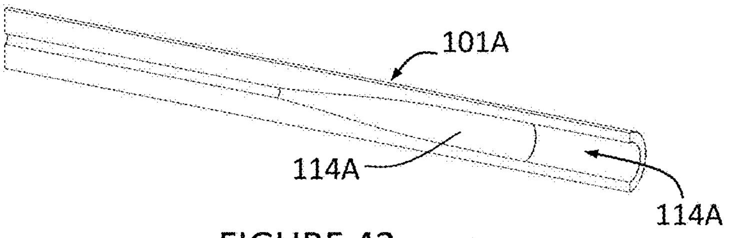
FIG. 41 depicts a perspective cross-sectional view of a hybrid baseball bat during the course of manufacture using a high-pressure method.
Figure 42:
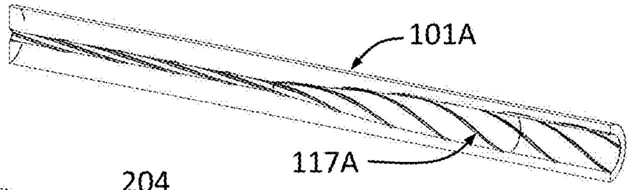
FIG. 42 depicts a perspective cross-sectional view of a hybrid baseball bat during the course of manufacture using a high-pressure method.
Figure 43:
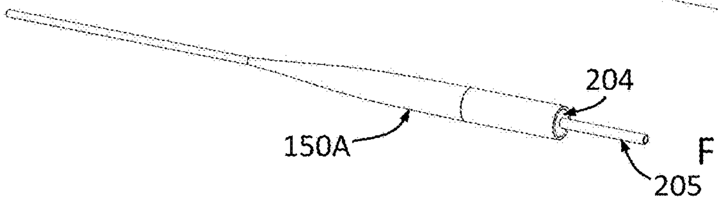
FIG. 43 depicts a perspective view of an expandable bladder seated in a fibrous sleeve during the course of manufacture of a hybrid baseball bat using a high-pressure method.
Figure 44:
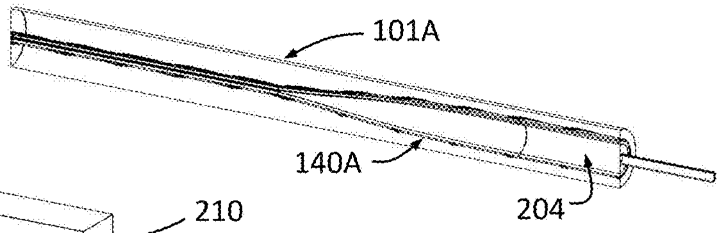
FIG. 44 depicts a perspective cross-sectional view of a hybrid baseball bat during the course of manufacture using a high-pressure method.
Figure 45:
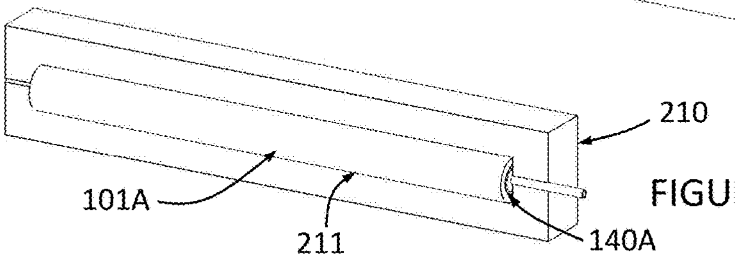
FIG. 45 depicts a perspective view of a hybrid baseball bat seated in a first mold form during the course of manufacture using a high-pressure method.
Figure 46:
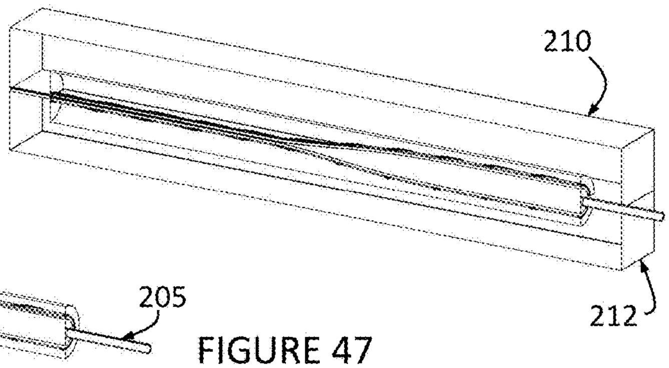
FIG. 46 depicts a perspective cross-sectional view of a hybrid baseball bat seated between a first and second mold form during the course of manufacture using a high-pressure method.
Figure 47:
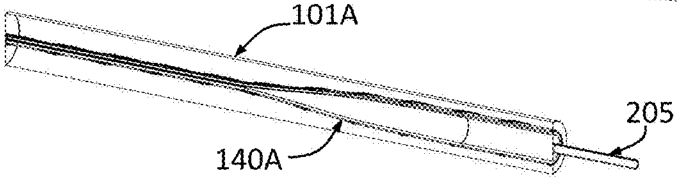
FIG. 47 depicts a perspective cross-sectional view of a hybrid baseball bat during the course of manufacture using a high-pressure method.
Figure 48:
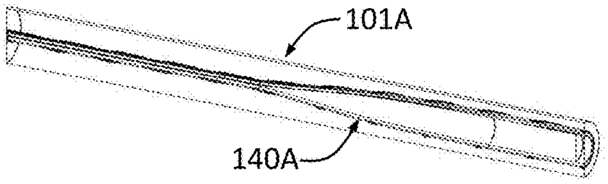
FIG. 48 depicts a perspective cross-sectional view of a hybrid baseball bat during the course of manufacture using a high-pressure method.
Figure 49:
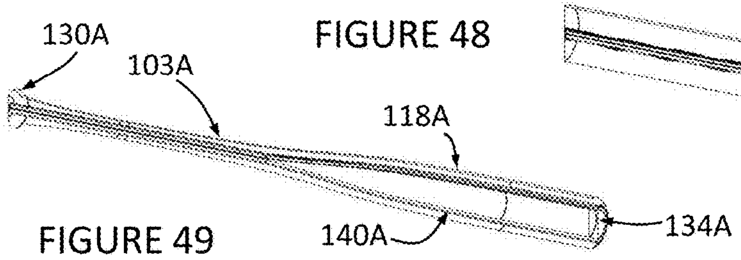
FIG. 49 depicts a perspective cross-sectional view of a hybrid baseball bat during the course of manufacture using a high-pressure method.

FIGS. 41-49 depict cross-sectional views of a hybrid baseball bat during various stages of manufacturing using the high pressure bladder method. FIG. 41 illustrates a wood billet 101A after gun drilling the central core 114A and with the optional step of roughening 117A the central surface in FIG. 42. In FIG. 43 the fibrous sleeve 150A is pulled over the inflatable bladder 204 and infiltrated with 2-part epoxy 148A. The fibrous sleeve and bladder are inserted into the central core (FIG. 44). The billet is placed into the first bat cavity 211 the first mold form 210 (FIG. 45). The mold is closed with the second mold form 212 aligning with the second bat cavity 213. The inflatable bladder 204 is inflated with high pressure at bladder inlet 205 with optional heat and pressure until fully cured (FIG. 46). The air pressure is released, the mold opened, and the billet 101A with core structure 140A is removed (FIG. 47). The inflatable bladder 204 is removed (FIG. 48), The end cap 134A is sealed in place, billet trimmed, and radial surface 112A profiled (FIG. 49).

The centrifugal force method begins with seating the wood shell with core structure (i.e. fibrous construct, epoxy, flexible rod, joiner plug) into a rotary machine such as a lathe (290) and spinning the wood shell with core structure at a high RPM (292) to capture the effects of centrifugal force which propels mass (fibrous construct and epoxy-resin) in an outward direction embedding them into the central surface of the radial wall thereby maximizing durability and minimizing any prospect of delamination. As one example, the wood shell with core structure is spun for 5 minutes at approximately 1,800 rpms and then at 50 rpms until fully cured. The centrifugal method can also incorporate the step of applying one or more additional measures such as heat and UV light to accelerate curing (278). Fixing the end cap at the distal end of the central core with adhesives (282). Then forming a preferred external profile of the hybrid bat utilizing a wood bit in standard or CNC lathe. Alternatively, the step forming an external profile of the hybrid baseball bat may be completed as an earlier step in the hybrid baseball bat forming process (250). As a preference, the central axis of the wood shell substantially horizontal during spinning when using the centrifugal force method.

Figure 20:
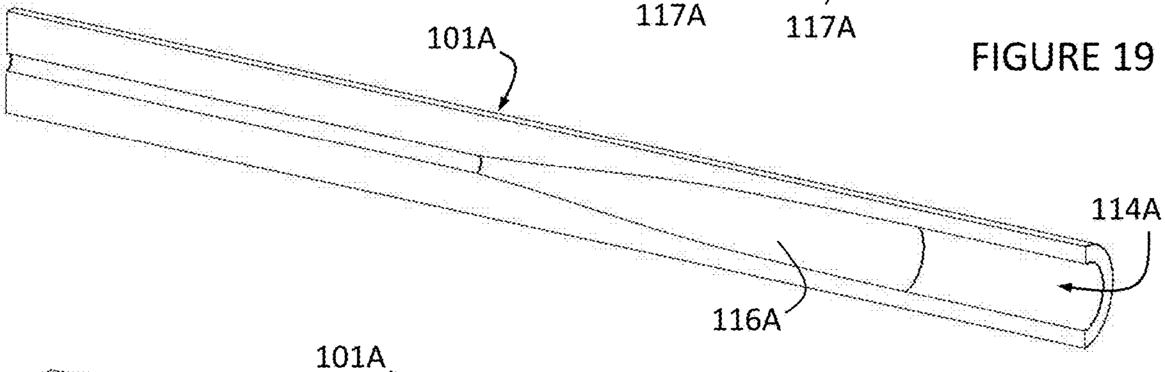
FIG. 20 depicts a perspective cross-sectional view of a hybrid baseball bat during the course of manufacture using a centrifugal force method.
Figure 21:
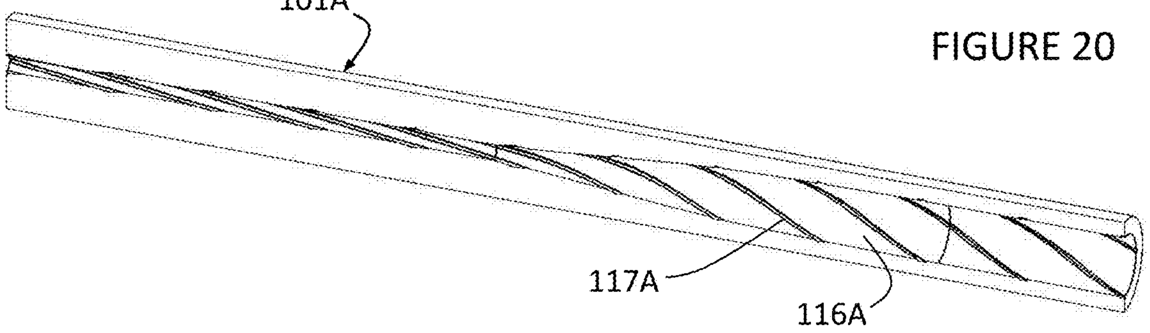
FIG. 21 depicts a perspective cross-sectional view of a hybrid baseball bat during the course of manufacture using a centrifugal force method.
Figure 22:
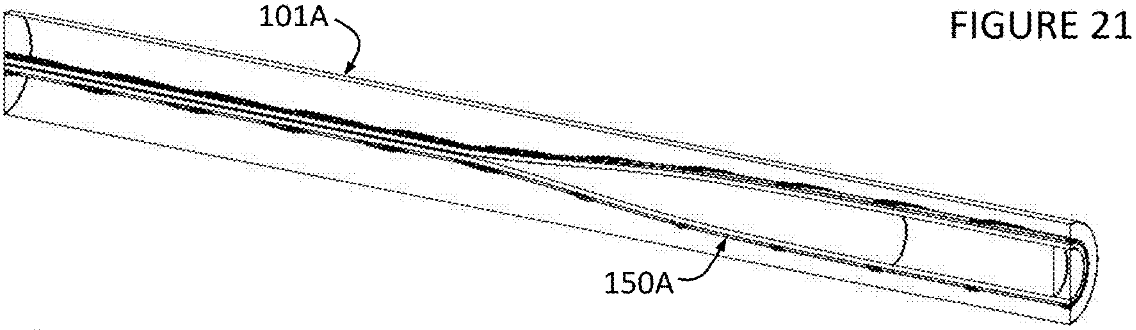
FIG. 22 depicts a perspective cross-sectional view of a hybrid baseball bat during the course of manufacture using a centrifugal force method.
Figure 23:
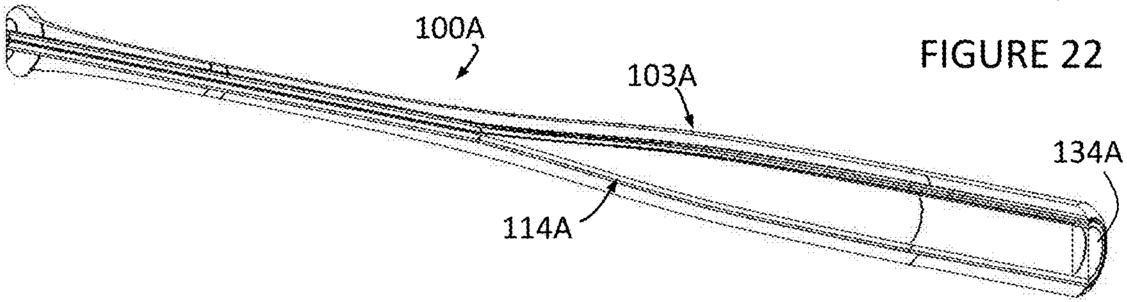
FIG. 23 depicts a perspective cross-sectional view of a hybrid baseball bat during the course of manufacture using a centrifugal force method.
Figure 24:
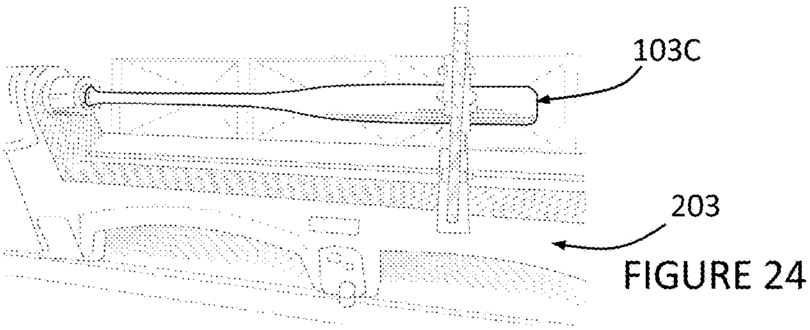
FIG. 24 depicts a perspective view of a wood shell during the course of manufacture.
Figure 25:
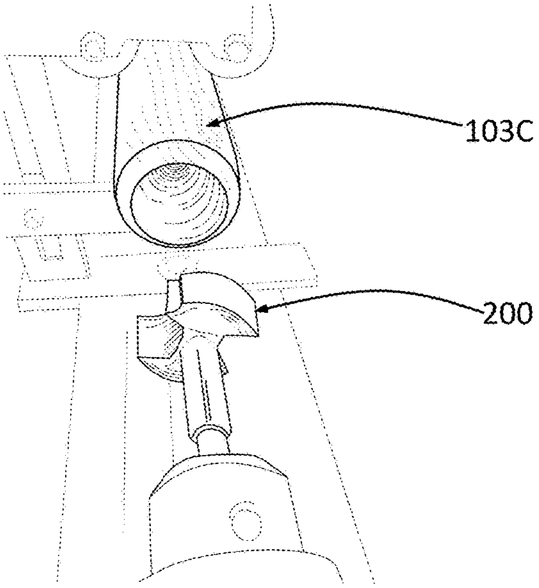
FIG. 25 depicts a perspective view of the central core of a wood shell during the course of manufacture.
Figure 26:
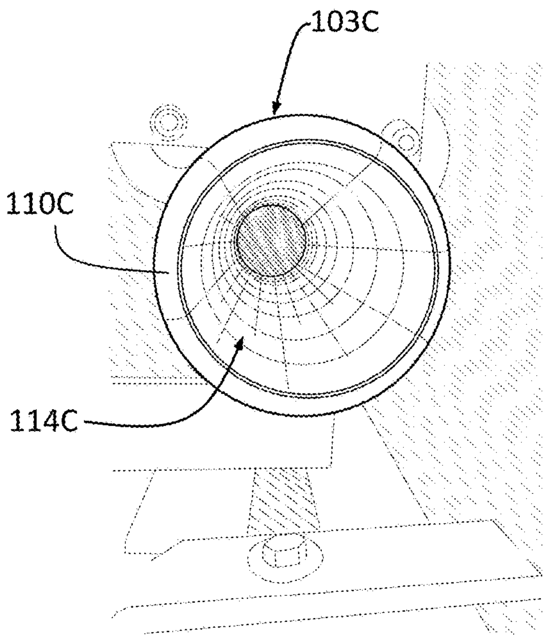
FIG. 26 depicts a perspective view of the central core of a wood shell during the course of manufacture.
Figure 27:
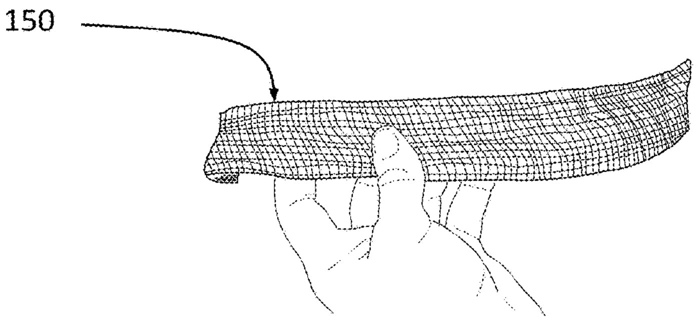
FIG. 27 depicts a perspective view of a flattened fibrous sleeve.
Figure 28:
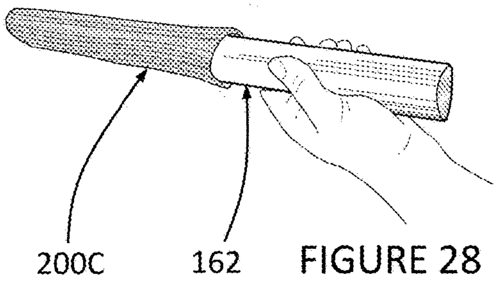
FIG. 28 depicts a perspective view of a fibrous sleeve during expansion by a forming stick.
Figure 29:
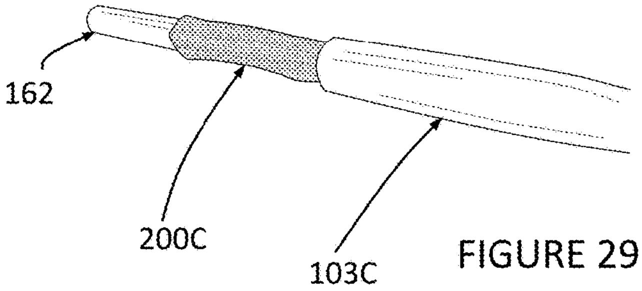
FIG. 29 depicts a perspective view of the fibrous sleeve of FIG. 27-28 being introduced into the central core of a wood shell.
Figure 30:
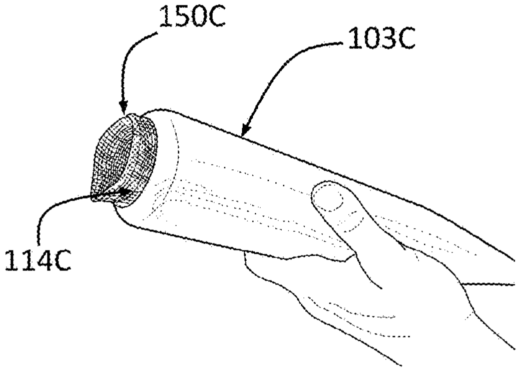
FIGS. 30 and 31 depicts a perspective view of a fibrous sleeve housed in a central core.
Figure 31:
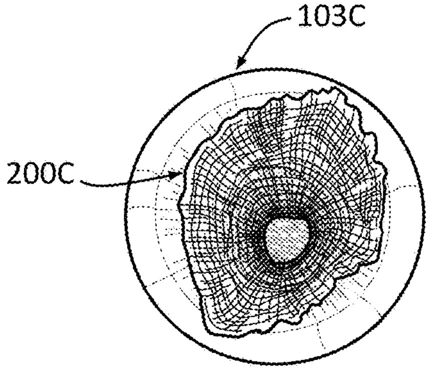
Figure 32:
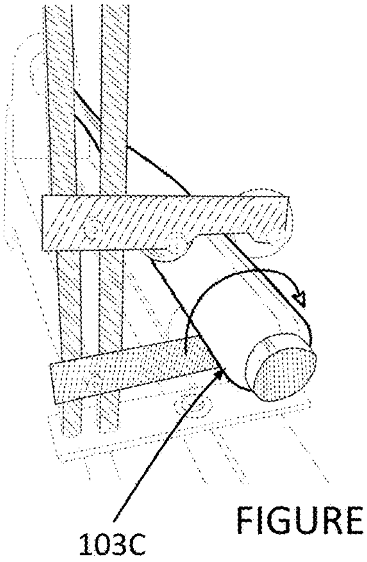
FIG. 32 depicts a perspective view of a hybrid baseball bat being spun at high speed during the course of manufacture using a centrifugal method.
Figure 33:
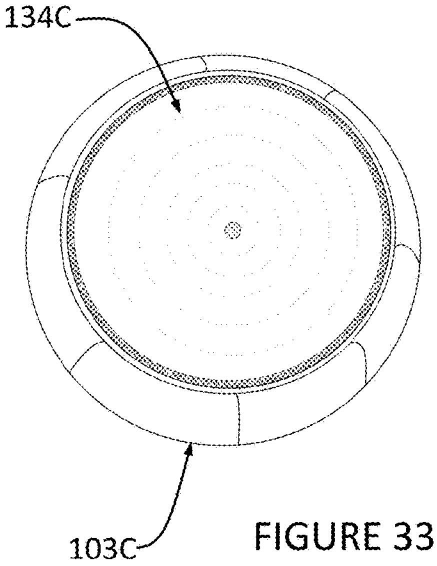
FIG. 33 depicts a perspective view of the end cap depicted in FIG. 32 after trimming.

FIGS. 20-23 depict cross-sectional views of a hybrid baseball bat during various stages of manufacturing using the centrifugal force method. FIG. 20 illustrates a billet 101A after gun drilling and FIG. 21 after roughening 117A by rifling (optional) the central surface 116A. FIG. 22 illustrates the wood billet 101A with a fibrous sleeve 150A inserted in the central core of the wood billet 101A from the distal end to the proximal end and epoxy 148A poured in from the barrel end, end cap 134A inserted, and spun about axis A in a lathe 203 until cured. In this embodiment, the external profiling of the radial wall 110A is cut forming the completed hybrid baseball bat 100A before final finishing (FIG. 23). FIG. 24 illustrates a wood shell mounted in a lathe 203. In this embodiment, a forstner bit is utilized to begin cutting the central core 114C as illustrated in FIGS. 25 and 26. FIG. 27 illustrates one form of a flattened carbon fiber sleeve 150 in a pre-finished condition. The fibrous sleeve 150 is expanded to roughly a cylindrical shape before insertion into the central core. FIG. 28 illustrates the use of a forming stick 162 driven down the internal chamber 151 of the fibrous sleeve to reform it to be roughly cylindrical. The fibrous sleeve 150 is then guided into the central core 1114C as illustrated in FIGS. 29-31. Epoxy 148 is poured into the central core 114C and the end cap 134C joined with the wood shell 103C. The wood shell 103C is then spun at high speed to disperse the epoxy into the central surface and fibrous sleeve (FIG. 32). The end cap 134C is trimmed (FIG. 33) and the exterior of the hybrid bat is treated with a wood finish.

If desired, at the completion of other manufacturing operations, one or more of the radial surfaces, end cap, and proximal end of the hybrid bat can be finished with one or more of stains and sealants.

It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A method of constructing a hybrid baseball bat comprising the steps of:

obtaining a wood billet at least the length of a baseball bat, trimming the wood billet to a predetermined length of a baseball bat, and cutting into the billet an external baseball bat profile;

cutting a profiled central surface defining a central core of a wood shell of the baseball bat;

infiltrating a fibrous sleeve tube with an epoxy;

covering the central surface with the fibrous sleeve tube; and applying radial forces to embed the fibrous sleeve tube in the central surface;

sliding an expandable bladder into the internal chamber of said fibrous sleeve tube; and pre-coating the fibrous sleeve tube with an epoxy and sliding the expandable bladder and fibrous sleeve tube into the central core of the wood shell.

2. The method of claim 1 whereas the step of applying radial forces to embed the fibrous sleeve tube in the central surface is by the use of one or more of a low pressure method and a centrifugal method.

3. The method of claim 1 further comprising the step of:

seating the wood shell in a rotary machine and spinning about the elongate axis of the wood shell whereas centrifugal force propels the fibrous sleeve tube and epoxy in an outward direction embedding it into the central surface of the central core of the wood shell.

4. The method of claim 1 further comprising the step of radially opening the fibrous sleeve with a forming stick before the step of covering the central surface with the fibrous sleeve.

5. A method of constructing a hybrid baseball bat comprising the steps of:

obtaining a wood billet, trimming the wood billet to a predetermined length, and cutting into the billet an external baseball bat profile;

cutting a profiled central surface defining a central core of a wood shell of the baseball bat;

infiltrating a fibrous sleeve with an epoxy;

covering the central surface with the fibrous sleeve; and applying radial forces to embed the fibrous sleeve in the central surface;

seating an end of a flexible rod in a plug aperture of a joiner plug;

positioning the joiner plug in a proximal end of an internal chamber of said fibrous sleeve; and seating the joiner plug, flexible rod, and fibrous sleeve in said central core.

6. The method of claim 5 whereas the step of applying radial forces to embed the fibrous sleeve in the central surface is by the use of one or more of a low pressure method, a high pressure method, and a centrifugal method.

7. The method of claim 5 whereas the step of cutting a profiled central surface defining a central core of a wood shell of the baseball bat further comprises the step of roughening the central surface using machine operations.

8. The method of claim 5 whereas the step of cutting a profiled central surface defining a central core of a wood shell of the baseball bat further comprises the step of cutting the profiled central surface the entire distance from a proximal end to a distal end of the hybrid baseball bat.

9. The method of claim 5 further comprising the step of:

sliding an expandable bladder into the internal chamber of said fibrous sleeve;

pre-coating the fibrous sleeve with an epoxy and sliding the expandable bladder and fibrous sleeve into the central core of the wood shell.

10. The method of claim 9 further comprising the step of: placing the wood shell, core structure, and bladder in a mold.

11. The method of claim 10 further comprising the step of: inflating the expandable bladder thereby applying a high radial force causing consequent embedding of the fibrous sleeve into the central surface of the central core.

12. The method of claim 11 further comprising the step of: removing the bat from the mold.

13. The method of claim 12 further comprising the step of removing the expandable bladder after the epoxy cures.

14. The method of claim 5 further comprising the step of: spinning the wood shell along its central axis causing consequent embedding of the fibrous sleeve with epoxy into the central surface of the central core.

15. The method of claim 5 further comprising the step of applying at least one of ultraviolet light and radiation to facilitate curing of the epoxy.

16. The method of claim 5 further comprising the step of: seating the wood shell in a rotary machine and spinning about the elongate axis of the wood shell whereas centrifugal force propels the sleeve and epoxy in an outward direction embedding it into the central surface of the central core.

17. The method of claim 5 further comprising the step of: fixing an end cap into the central core using an adhesive.

18. The method of claim 5 whereas the step of infiltrating a fibrous sleeve with an epoxy further comprises the step of: precoating the fibrous sleeve tube or pouring the epoxy down the fibrous sleeve tube.

19. The method of claim 5 further comprising the step of radially opening the fibrous sleeve tube with a forming stick before the step of covering the central surface with the fibrous sleeve.

20. A method of constructing a hybrid baseball bat comprising the steps of:

obtaining a wood billet, trimming the wood billet to a predetermined length, and cutting into the billet an external baseball bat profile;

cutting a profiled central surface defining a central core of a wood shell of the baseball bat;

infiltrating a fibrous sleeve with an epoxy;

covering the central surface with the fibrous sleeve; and applying radial forces to embed the fibrous sleeve in the central surface;

seating an end of a flexible rod in a plug aperture of a joiner plug;

attaching the fiber sleeve on an edge at the first end of the joining plug;

inserting the plug and flexible rod assembly into the central core of the wood shell until it is fully seated.

* * * * *